United States Patent
Inoue et al.

(10) Patent No.: US 12,462,378 B2
(45) Date of Patent: Nov. 4, 2025

(54) INFORMATION PROCESSING DEVICE, SCREENING DEVICE, INFORMATION PROCESSING METHOD, SCREENING METHOD, AND PROGRAM

(71) Applicant: Kyoto University, Kyoto (JP)

(72) Inventors: Haruhisa Inoue, Kyoto (JP); Takayuki Kondo, Kyoto (JP); Yuichiro Yada, Kyoto (JP)

(73) Assignee: Kyoto University, Kyoto (JP)

( * ) Notice: Subject to any disclaimer, the term of this patent is extended or adjusted under 35 U.S.C. 154(b) by 532 days.

(21) Appl. No.: 17/614,218

(22) PCT Filed: May 28, 2020

(86) PCT No.: PCT/JP2020/021177
§ 371 (c)(1),
(2) Date: Nov. 24, 2021

(87) PCT Pub. No.: WO2020/241772
PCT Pub. Date: Dec. 3, 2020

(65) Prior Publication Data
US 2022/0215543 A1    Jul. 7, 2022

(30) Foreign Application Priority Data
May 31, 2019    (JP) ................ 2019-103293

(51) Int. Cl.
*G06T 7/00*    (2017.01)
*A61B 5/00*    (2006.01)
(Continued)

(52) U.S. Cl.
CPC .......... *G06T 7/0012* (2013.01); *A61B 5/4076* (2013.01); *A61B 5/4082* (2013.01);
(Continued)

(58) Field of Classification Search
CPC ......... G06T 7/0012; G06T 2207/30016; G06T 2207/10056; G06T 2207/20084;
(Continued)

(56) References Cited

U.S. PATENT DOCUMENTS 7,711,174 B2    5/2010    Sammak et al.
9,097,727 B2    8/2015    Inoue et al.
(Continued)

FOREIGN PATENT DOCUMENTS

JP    2013520960    6/2013
JP    2018045559    3/2018
(Continued)

OTHER PUBLICATIONS

Witmer, A. and Bhanu, B., Aug. 2018. Multi-label classification of stem cell microscopy images using deep learning. In 2018 24th International Conference on Pattern Recognition (ICPR) (pp. 1408-1413). IEEE.*

(Continued)

*Primary Examiner* — Zhitong Chen
(74) *Attorney, Agent, or Firm* — Dority & Manning, P.A.

(57) ABSTRACT

An information processing device includes: an acquirer configured to acquire images obtained by imaging cells differentiated from pluripotent stem cells derived from a subject; and a predictor configured to input the images acquired by the acquirer to a model trained on data in which information indicating at least a neurodegenerative disease is associated with the image obtained by imaging the cells of the neurodegenerative disease differentiated from the pluripotent stem cells, and predict an onset of the neurodegenerative disease of the subject or effects of drugs on the neurodegenerative disease, based on output results of the model to which the images were input.

14 Claims, 18 Drawing Sheets
Specification includes a Sequence Listing.

(51) Int. Cl.
*G06N 20/20* (2019.01)
*G16H 30/20* (2018.01)
*G16H 50/20* (2018.01)
*G16H 50/30* (2018.01)
*G16H 50/70* (2018.01)

(52) U.S. Cl.
CPC ........... *A61B 5/4088* (2013.01); *G06N 20/20* (2019.01); *G16H 30/20* (2018.01); *G16H 50/20* (2018.01); *G16H 50/30* (2018.01); *G16H 50/70* (2018.01); *G06T 2207/30016* (2013.01)

(58) Field of Classification Search
CPC ........ G06T 2207/30024; A61B 5/4076; A61B 5/4082; A61B 5/4088; G06N 20/20; G06N 3/0464; G06N 3/084; G06N 3/09; G16H 30/20; G16H 50/20; G16H 50/30; G16H 50/70; G16H 20/10; G16H 30/40; G16H 40/67; G06V 10/82; G06V 20/69; C12M 41/48
See application file for complete search history.

(56) References Cited

U.S. PATENT DOCUMENTS

| | | | |
|---|---|---|---|
| 10,249,389 B2 | 4/2019 | Athey et al. | |
| 11,037,292 B2 | 6/2021 | Wakui | |
| 2006/0039593 A1 | 2/2006 | Sammak et al. | |
| 2013/0034858 A1 | 2/2013 | Inoue et al. | |
| 2015/0301028 A1* | 10/2015 | Eggan ............. | G01N 33/5023 435/29 |
| 2015/0301030 A1 | 10/2015 | Eggan et al. | |
| 2016/0186146 A1* | 6/2016 | Thomson ............. | C12N 5/0619 702/19 |
| 2018/0082215 A1 | 3/2018 | Mizobuchi | |
| 2022/0028488 A1 | 1/2022 | Rubin et al. | |
| 2022/0215543 A1 | 7/2022 | Inoue et al. | |

FOREIGN PATENT DOCUMENTS

| | | |
|---|---|---|
| WO | WO2011047103 A3 | 4/2011 |
| WO | WO2011108766 | 9/2011 |
| WO | WO2016/144838 A | 9/2016 |
| WO | WO2017022854 | 2/2017 |
| WO | WO2017136285 A1 | 8/2017 |
| WO | WO2018211687 | 11/2018 |
| WO | WO2018216705 | 11/2018 |
| WO | WO2020118158 A1 | 6/2020 |

OTHER PUBLICATIONS

Witmer, A. and Bhanu, B., 2018, August. Multi-label classification of stem cell microscopy images using deep learning. In 2018 24th International Conference on Pattern Recognition (ICPR) (pp. 1408-1413). IEEE.*
Tong, T., Ledig, C., Guerrero, R., Schuh, A., Koikkalainen, J., Tolonen, A., Rhodius, H., Barkhof, F., Tijms, B., Lemstra, A.W. and Soininen, H., 2017. Five-class differential diagnostics of neurodegenerative diseases using random undersampling boosting. NeuroImage: Clinical, 15, pp. 613-624.*
Office Action for corresponding SG Application No. 11202113016U, dated Jul. 13, 2023, 11 pages.
Supplementary European Search Report received in corresponding Application No. EP 20 81 4392, dated May 26, 2023, 12 pages.
Eric M. Christiansen et al., In silico labeling: Predicting fluorescent labels in unlabeled images, Cell. Apr. 19, 2018; 173(3): 792-803.
Nicolas Coudray et al., Classification and mutation prediction from non-small cell lung cancer histopathology images using deep learning, Nature Medicine, vol. 24, Oct. 2018, 1559-1567.
T. Kondo et al., 15. Therapeutic application of iPS cells, Nihon Naika Gakkai Zasshi, 2013, vol. 102, No. 8, pp. 2015-2022.
International Search Report for PCT/JP2020/021177 mailed Aug. 18, 2020, 5 pages.
Vlachostergiou et al., "Multi-Task Learning for Predicting Parkinson's Disease Based on Medical Imaging Information", 25$^{th}$ IEEE International Conference on Image Processing (ICIP), Athens, Greece, 2018, pp. 2052-2056.
Centeno et al., "2D versus 3D human induced pluripotent stem cell-derived cultures for neurodegenerative disease modelling." Molecular Neurodegeneration, vol. 13, No. 27, 2018, pp. 1-15.
European Search Report for corresponding European Application No. 20812823.1, mailed May 8, 2023, 15 pages.
Fan et al., "A Machine Learning Assisted, Label-Free, Non-invasive Approach for Somatic Reprogramming in Induced Pluripotent Stem Cell Colony Formation Detection and Prediction", 2017, pp. 1-9.
International Search Report (w/English translation) for corresponding PCT/JP2020/021384, mailed Aug. 18, 2020, 5 pages.
Kusumoto et al., "Automated Deep Learning-Based System to Identify Endothelial Cells Derived from Induced Pluripotent Stem Cells", vol. 10, Stem Cell Reports, Jun. 5, 2018, pp. 1687-1695.
Office Action for corresponding SG Application No. 11202113100T, dated Jul. 13, 2023, 14 pages.
Waisman et al., "Deep Learning Neural Networks Highly Predict Very Early Onset of Pluripotent Stem Cell Differentiation", vol. 12, Stem Cell Reports, 2019, pp. 845-859.
Shi et al., "A Human Stem Cell Model of Early Alzheimer's Disease Pathology in Down Syndrome", Science Translation Medicine, vol. 4, Issue 124, Mar. 7, 2012, 9 pages.
Imaizumi et al., "Modeling human neurological disorders with induced pluripotent stem cells", Journal of Neurochemistry, 129, 2014, pp. 388-399.

* cited by examiner

FIG. 10

| | | | | | | |
|---|---|---|---|---|---|---|
| | | | | SC | | |
| | | | MC | | PMSC | |
| | | C | MS | MSC | | |
| | S | PC | PSC | | | |
| | M | PS | PMC | | | |
| Non | P | PM | PMS | | | |
| NO COATING | 1 TYPE | 2 TYPES | 3 TO 4 TYPES | | | |

FIG. 11

| | | | | | |
|---|---|---|---|---|---|
| NO COATING | Non | | | | |
| 1 TYPE | | P | M | S | C |
| 2 TYPES | | PM | PS | PC | MS | MC | SC |
| 3 TO 4 TYPES | | PMS | PMC | PSC | MSC | PMSC |

FIG. 23

| Diseases or Functions Annotation |
| --- |
| Morbidity or mortality |
| Organismal death |
| Apoptosis |
| Necrosis |
| Morphology of body cavity |
| Cell movement |

INFORMATION PROCESSING DEVICE, SCREENING DEVICE, INFORMATION PROCESSING METHOD, SCREENING METHOD, AND PROGRAM

SEQUENCE LISTING

This application contains a Sequence Listing which has been submitted electronically in ASCII format and is hereby incorporated by reference in its entirety. Said ASCII copy is named SHIG-121-PCT-US_Sequence_Listing.txt and is 540 bytes in size.

TECHNICAL FIELD

The present invention relates to an information processing device, a screening device, an information processing method, a screening method, and a program.

The present application is a national phase entry of International Patent Application No. PCT/JP2020/021177 filed on May 28, 2020, which is based upon and claims the right of priority to Japanese Patent Application No. 2019-103293, filed May 31, 2019, the content of which is incorporated herein by reference.

BACKGROUND ART

Technology that uses machine learning to determine microscopic images of cells and tissues is being studied. For example, Non-Patent Document 1 describes that it was possible to identify the nuclei, life and death of cells, and cell types (whether or not the cells were nerve cells) by a machine-learned model of microscopic images of cultured cells. Non-Patent Document 2 describes that it was possible to identify lung adenocarcinoma, squamous cell carcinoma, and healthy lung tissues by a machine-learned model of microscopic images of pathologic tissues of lung cancer.

CITATION LIST

Patent Literature

Non-Patent Document

[Non-Patent Document 1]
  Christiansen E. M., et al., In Silico Labeling: Predicting Fluorescent Labels in Unlabeled Images, Cell, 173 (3), 792-803, 2018.
[Non-Patent Document 2]
  Coudray N. et al., Classification and mutation prediction from non-small cell lung cancer histopathology images using deep learning, Nat Med., 24 (10), 1559-1567, 2018.

SUMMARY OF INVENTION

Technical Problem

However, the learned models described in Non-Patent Documents 1 and 2 determine the current state of cells and tissues, but do not predict the diseases that the subjects will develop in the future.

An object of the present invention is to provide an information processing device, a screening device, an information processing method, a screening method, and a program capable of accurately predicting future diseases of a subject based on images of cells differentiated from pluripotent stem cells derived from the subject.

Solution to Problem

According to an aspect of the present invention, there is provided an information processing device including: an acquirer configured to acquire images obtained by imaging cells differentiated from pluripotent stem cells derived from a subject; and a predictor configured to input the images acquired by the acquirer to a model trained on data in which information indicating at least a neurodegenerative disease is associated with an image obtained by imaging cells of the neurodegenerative disease differentiated from pluripotent stem cells, and predict onset of the neurodegenerative disease of the subject or effects of drugs on the neurodegenerative disease, based on output results of the model to which the images were input.

Advantageous Effects of Invention

According to an aspect of the present invention, it is possible to accurately predict a future disease of a subject based on images of cells differentiated from pluripotent stem cells derived from the subject.

BRIEF DESCRIPTION OF DRAWINGS

FIG. 10 is a view illustrating a photomicrograph obtained by photographing nerve cells one day after seeding the nerve cells into 96-well plates with various coatings.

FIG. 11 is a view illustrating a photomicrograph obtained by photographing nerve cells ten days after seeding the nerve cells into 96-well plates with various coatings.

FIG. 23 is a view illustrating an example of analysis results of Pathway.

DESCRIPTION OF EMBODIMENTS

Hereinafter, an information processing device, a screening device, an information processing method, a screening method, and a program to which the present invention is applied will be described with reference to the drawings.

First Embodiment

[Overall Configuration]

Figure 1:
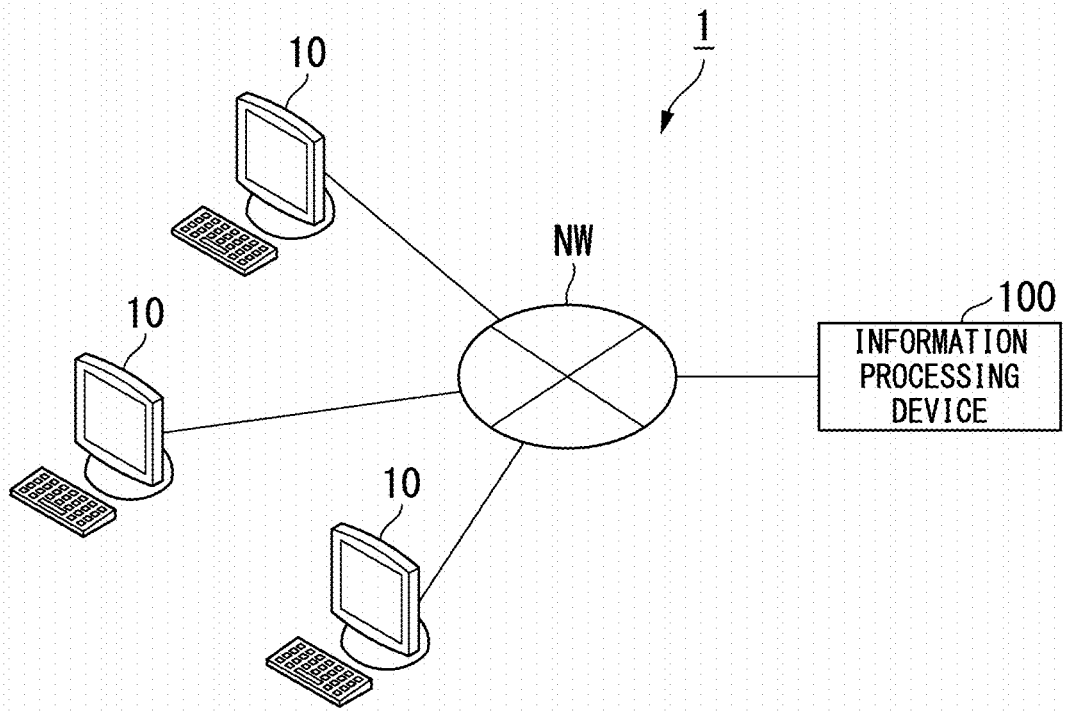
FIG. 1 is a view illustrating an example of an information processing system including an information processing device according to a first embodiment.

FIG. 1 is a view illustrating an example of an information processing system 1 including an information processing device 100 according to a first embodiment. The information processing system 1 according to the first embodiment includes, for example, one or more terminal devices 10 and the information processing device 100. These devices are connected to each other via a network NW. The network NW includes, for example, the Internet, a wide area network (WAN), a local area network (LAN), a provider terminal, a wireless communication network, a wireless base station, a dedicated line, and the like. All of the devices in a combination illustrated in FIG. 1 do not need to be able to communicate with each other, and the network NW may include some local networks.

The terminal device 10 is, for example, a terminal device including an input device, a display device, a communication device, a storage device, and a computing device. Specifically, the terminal device 10 can be a personal computer, a cell phone, or a tablet terminal. The communication device includes a network card such as a network interface card (NIC), a wireless communication module, and the like. For example, the terminal device 10 may be installed in a facility (for example, a research institute, a university, or a company) that conducts research and development of new drugs using pluripotent stem cells.

The pluripotent stem cells mentioned above include, for example, embryonic stem cells (ES cells), induced pluripotent stem cells (iPS cells), embryonic stem (ntES) cells derived from cloned embryos obtained by nuclear transplantation, sperm stem cells ("GS cells"), embryonic germ cells ("EG cells"), induced pluripotent stem (iPS) cells, and the like. Preferred pluripotent stem cells are ES cells, iPS cells, and ntES cells. More preferred pluripotent stem cells are human pluripotent stem cells, particularly human ES cells and human iPS cells. Furthermore, the cells that can be used in the present invention are not only pluripotent stem cells, but also a group of cells induced by so-called "direct reprogramming", in which the cells are directly induced to differentiate into desired cells without going through pluripotent stem cells.

For example, an employee or the like working at a facility may capture an image of a desired cell induced to differentiate from pluripotent stem cells using a microscope or the like, and transmit the captured digital image (hereinafter, referred to as a cell image IMG) to the information processing device 100 via the terminal device 10.

When the information processing device 100 receives the cell image IMG from the terminal device 10, by using deep learning, based on the cell image IMG, it may be predicted that the subject (user) from whom the pluripotent stem cells were extracted before differentiation induction will develop a specific neurodegenerative disease at some point in the future.

The cells induced to differentiate from pluripotent stem cells may be, for example, nerve cells, glial cells, vascular endothelial cells, pericytes, choroid plexus cells, immune system cells, and the like, which are related to neurodegenerative diseases. Examples of the neurodegenerative diseases include Alzheimer's disease, Parkinson's disease, amyotrophic lateral sclerosis (ALS), spinocerebellar degeneration, frontotemporal lobar degeneration, Lewy body dementia, multiple system atrophy, Huntington's disease, progressive supranuclear palsy, or corticobasal degeneration. The cells of the neurodegenerative diseases differentiated from pluripotent stem cells are cells differentiated from pluripotent stem cells that show a phenotype of the neurodegenerative diseases. As the cells of neurodegenerative diseases differentiated from pluripotent stem cells, for example, cells obtained by culturing cells differentiated from pluripotent stem cells derived from patients with neurodegenerative diseases, cells differentiated from pluripotent stem cells derived from healthy subjects into which a genetic mutation that causes neurodegenerative diseases has been introduced, and cells differentiated from pluripotent stem cells derived from healthy subjects, under the conditions that cause neurodegenerative diseases, can be used.

For example, in a case where the cells induced to differentiate from pluripotent stem cells are nerve cells, the information processing device 100 predicts that the subject from whom the pluripotent stem cells were extracted will develop Alzheimer's disease at some point in the future. Alzheimer's disease is characterized by the accumulation of substances such as amyloid beta or tau proteins in the nerve cells of the brain, as well as by the atrophy of the brain due to the death of nerve cells. Therefore, by predicting that nerve cells induced to differentiate from pluripotent stem cells will show a phenotype of the neurodegenerative diseases at some point in the future, the information processing device 100 determines whether or not the subject will develop Alzheimer's disease at some point in the future. A phenotype is a genotype of an organism expressed as a trait, and includes, for example, the morphology, structure, behavior, and physiological properties of the organism. Examples of the phenotype of neurodegenerative diseases include amyloid beta accumulation, tau protein accumulation, and cell death in nerve cells. Hereinafter, as an example, it is assumed that the cells induced to differentiate from pluripotent stem cells are nerve cells, that the neurodegenerative disease is Alzheimer's disease, and that the phenotype of the disease is cell death.

[Configuration of Information Processing Device]

Figure 2:
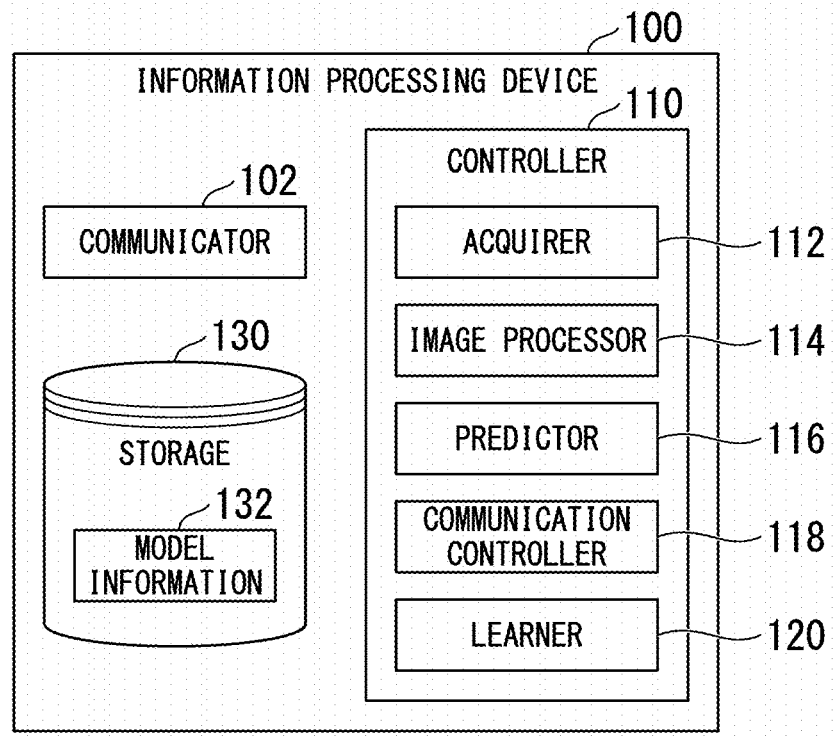
FIG. 2 is a view illustrating an example of a configuration of the information processing device according to the first embodiment.

FIG. 2 is a view illustrating an example of a configuration of the information processing device 100 according to the first embodiment. As illustrated in the drawing, the information processing device 100 includes, for example, a communicator 102, a controller 110, and a storage 130.

The communicator 102 includes a communication interface, such as an NIC. The communicator 102 communicates with the terminal device 10 and the like via the network NW.

The controller 110 includes, for example, an acquirer 112, an image processor 114, a predictor 116, a communication controller 118, and a learner 120.

The components of the controller 110 are realized, for example, by a processor such as a central processing unit (CPU) or a graphics processing unit (GPU) executing programs stored in the storage 130. Some or all of the components of the controller 110 may be realized by hardware (circuitry) such as a large scale integration (LSI), an application specific integrated circuit (ASIC), or a field-programmable gate array (FPGA), or may be realized by the cooperation of software and hardware.

The storage 130 is realized, for example, by a storage device such as a hard disc drive (HDD), a flash memory, an electrically erasable programmable read only memory (EEPROM), a read only memory (ROM), a random access memory (RAM), and the like. In addition to various programs such as firmware and application programs, model information 132 is stored in the storage 130. The model information 132 will be described later.

[Runtime Processing Flow]

Figure 3:
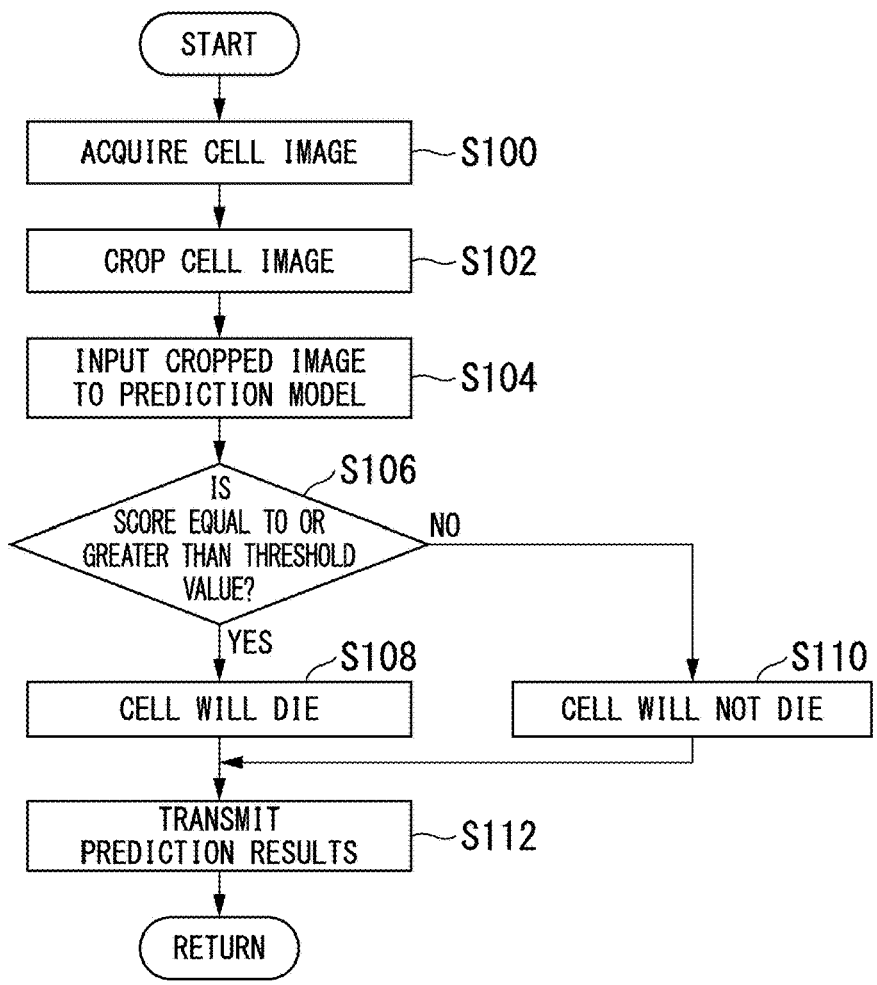
FIG. 3 is a flowchart illustrating a flow of a sequence of runtime processing by a controller according to the first embodiment.

Hereinafter, a flow of a sequence of runtime processing by the controller 110 according to the first embodiment will be described with reference to a flowchart. Runtime is a state where a prediction model MDL that has already been learned is used. FIG. 3 is a flowchart illustrating a flow of a sequence of runtime processing by the controller 110 according to the first embodiment. The process in the present flowchart may be repeated in a predetermined cycle, for example.

First, the acquirer 112 acquires the cell image IMG of a nerve cell from the terminal device 10 via the communicator 102 (step S100).

Next, the image processor 114 crops the cell image IMG acquired by the acquirer 112 to generate a plurality of images (hereinafter, referred to as a cropped image $IMG_C$) having a smaller size than that of the cell image IMG (step S102).

Figure 4:
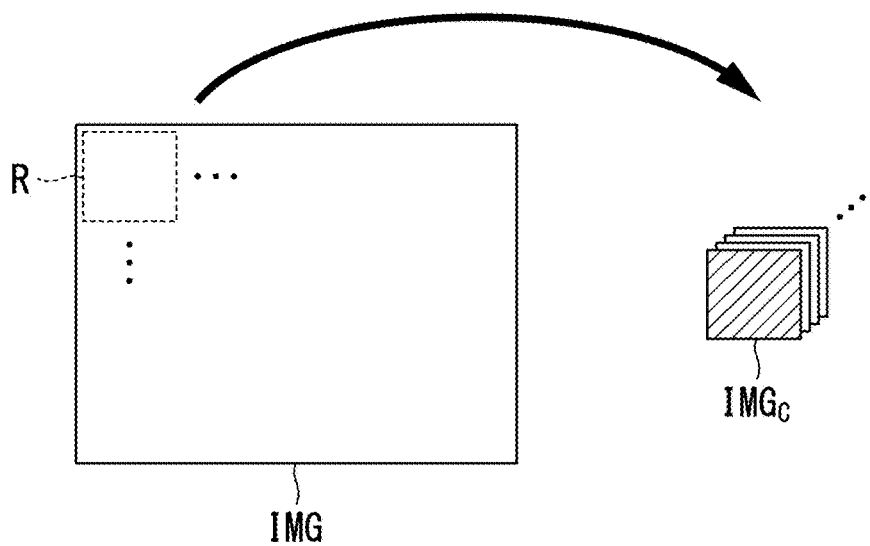
FIG. 4 is a view showing a generation method of a cropped image.

FIG. 4 is a view showing a generation method of the cropped image $IMG_C$. For example, the image processor 114 generates several hundreds (for example, approximately 120) of cropped images $IMG_C$ by scanning a region R (also referred to as a crop region) of a certain aspect ratio while sliding the region R on the cell image IMG, and by cutting out a pixel region overlapping the region R as the cropped image $IMG_C$.

The aspect ratio of the region R may be, for example, a ratio of 128×128 pixels, 256×256 pixels, 512×512 pixels, 768×768 pixels, or 1020×1020 pixels. It is assumed that the aspect ratio of the region R is the aspect ratio during training, as will be described below. For example, the greater the aspect ratio of the region R and the greater the size of the cropped image $IMG_C$, the higher the prediction accuracy will be, although the calculation load of deep learning will increase. In other words, it is suitable to increase the size of the cropped image $IMG_C$ to improve the prediction accuracy, and to decrease the size of the cropped image $IMG_C$ to improve the calculation speed.

Description will return to the flowchart in FIG. 3. Next, the predictor 116 inputs the plurality of cropped images $IMG_C$ generated by the image processor 114 to the prediction model MDL indicated by the model information 132 (step S104).

The model information 132 is information (program or data structure) that defines the prediction model MDL for predicting cell death of the nerve cell, from the cell image of the nerve cell. The prediction model MDL is implemented by various neural networks, such as a convolutional neural network (CNN).

The model information 132 includes, for example, various types of information such as coupling information on how the units included in each of an input layer, one or more hidden layers (intermediate layers), and an output layer that configure each neural network are coupled to each other, coupling coefficients given to the data input and output between the coupled units, and the like. The coupling information includes, for example, the number of units included in each layer, information specifying the type of the units to which each unit is coupled, the activation function that implements each unit, and the gates provided between neurons in the hidden layer. The activation function that implements the neuron may be, for example, a normalized linear function (ReLU function), a sigmoid function, a step function, or any other function. The gates, for example, selectively pass or weight the data transmitted between the units depending on the value (for example, 1 or 0) returned by the activation function. The coupling coefficients include, for example, the weight given to the output data when the data is output from a unit in one layer to a unit in a deeper layer, in the hidden layer of the neural network. The coupling coefficients may include the inherent bias component of each layer, and the like.

Figure 5:
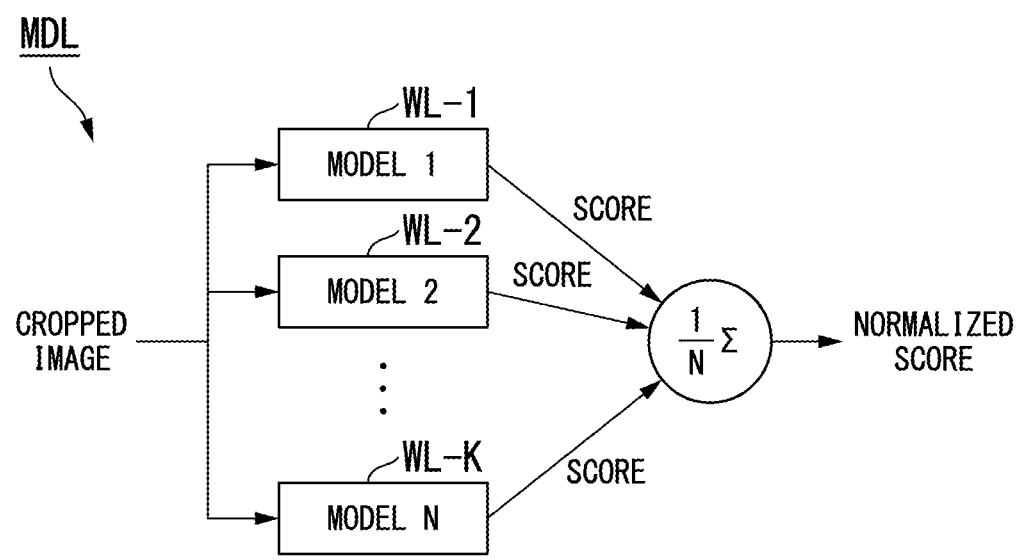
FIG. 5 is a view illustrating an example of a prediction model according to the first embodiment.

FIG. 5 is a view illustrating an example of the prediction model MDL according to the first embodiment. The prediction model MDL includes, for example, K models WL-1 to WL-K. Each model WL is a weak learner that has been pre-learned to output a score indicating the likelihood that the nerve cell will die as a likelihood or a probability, when the cropped image $IMG_C$ cut out from the cell image IMG of the nerve cell is input. For example, the model WL includes the CNN. Each model WL is in a parallel relationship with the others. The method of combining multiple weak learners to generate a single learning model in this manner is called ensemble learning.

For example, the prediction model MDL normalizes the scores of each model WL, which is a weak learner, and outputs the normalized score. The normalization of the score is shown in Equation (1). Equation (1) is implemented, for example, by a fully-connected layer.

[Equation 1]

$$S = \frac{1}{N}\sum_{i=1}^{N} s_i \quad (1)$$

S in the equation represents the normalized score, and $s_i$ represents the score of the i-th model WL. The scores $s_i$ and S are two-dimensional vectors (=[P1, P2]) of which elements are, for example, respectively, a probability P1 of cell death and a probability P2 that the cell will not die. As shown in Equation (1), the prediction model MDL may normalize the scores by dividing the sum of the scores of all models WL by K which is the total number of models WL. By using ensemble learning in this manner, it is possible to improve the prediction accuracy of cell death for unknown (unlearned) data that is not used in the training described below.

It is assumed that the prediction model MDL is a combination of K models WL, as illustrated in FIG. 5, but the invention is not limited thereto. For example, the prediction model MDL may be a single model WL.

Description will return to the flowchart in FIG. 3. Next, the predictor 116 determines whether or not the score (normalized score) output by the prediction model MDL is equal to or greater than a threshold value (step S106).

In a case where the score is equal to or greater than the threshold value, the predictor 116 predicts that the nerve cell will die (step S108), and in a case where the score is less than the threshold value, the predictor 116 predicts that the nerve cell will not die (step S110). In other words, in a case where the score is equal to or greater than the threshold value, the predictor 116 determines that there is a high probability of the onset of Alzheimer's disease, and in a case where the score is less than the threshold value, the predictor 116 determines that there is a low probability of the onset of Alzheimer's disease.

Next, the communication controller 118 transmits the prediction result of the predictor 116 to the terminal device 10 via the communicator 102 (step S112). For example, the communication controller 118 may transmit information indicating the presence or absence of cell death of the nerve cell, or may transmit information indicating the probability of the onset of Alzheimer's disease.

For example, in a case where the information indicating the presence or absence of cell death of the nerve cell is transmitted to the terminal device 10, the user operating the terminal device 10 can ascertain whether the nerve cells in the cell image IMG transmitted to the information processing device 100 are destined to die or not to die at some point in the future. In other words, the user can ascertain whether or not the subject from whom the pluripotent stem cells were extracted before being induced to differentiate into nerve cells will develop Alzheimer's disease in the future.

[Training Processing Flow]

Figure 6:
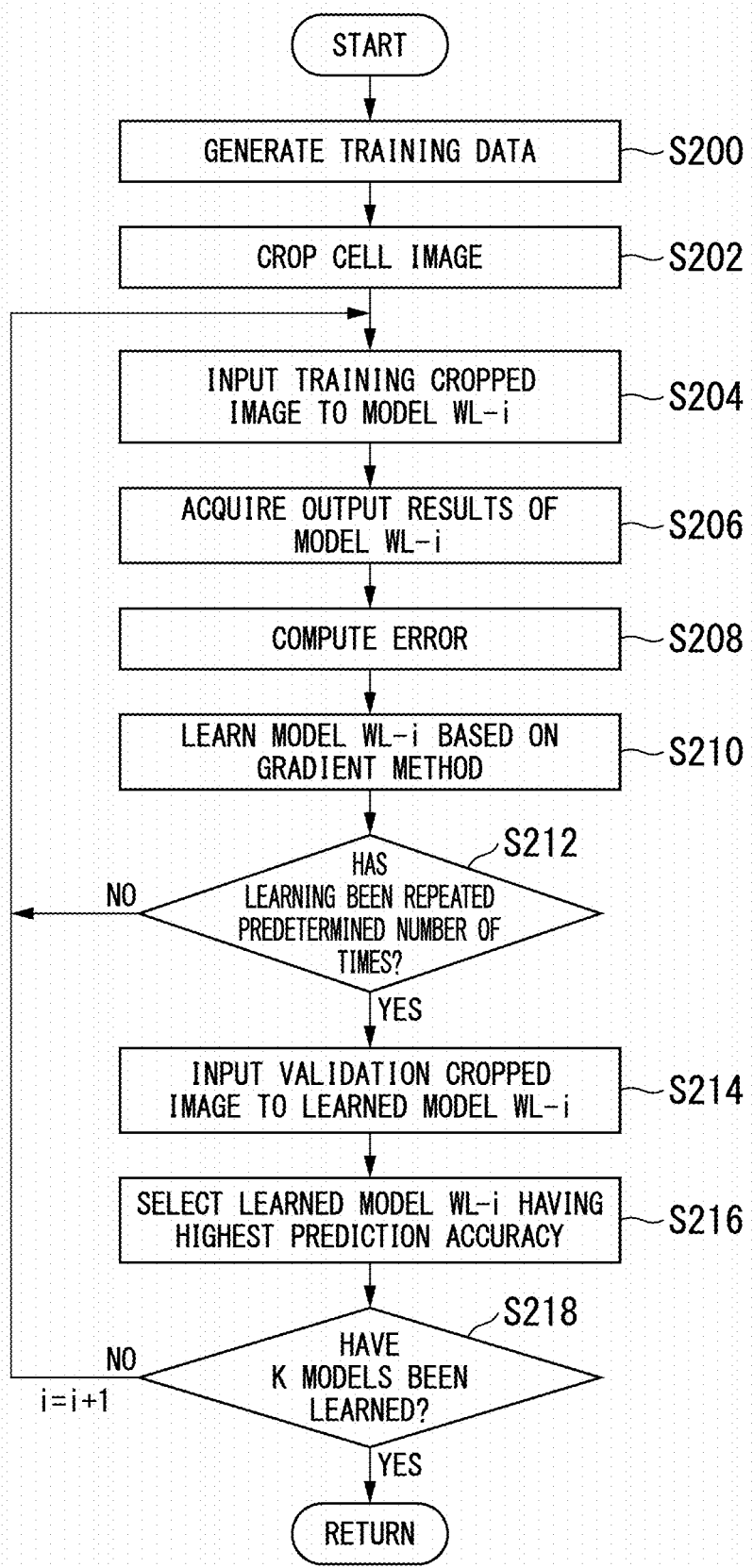
FIG. 6 is a flowchart illustrating a sequence of training processing by a controller according to the first embodiment.

Hereinafter, a flow of a sequence of training processing by the controller 110 according to the first embodiment will be described with reference to a flowchart. Training is a state where the prediction model MDL used in runtime is learned. FIG. 6 is a flowchart illustrating a sequence of training processing by the controller 110 according to the first embodiment.

First, the learner 120 generates the training data for learning the prediction model MDL (step S200). For example, the training data is data in which information indicating that the nerve cell will die at some point in the future is associated with the cell image IMG obtained by imaging the nerve cell induced to differentiate from pluripotent stem cells, as a teaching label (also referred to as a target). In other words, the training data is a dataset that combines the input data and the output data, while the cell image IMG obtained by imaging the nerve cell induced to differentiate from pluripotent stem cells is the input data, and the information indicating a phenotype of the neurodegenerative diseases such as cell death is correct output data. The cell death at some point in the future represents a more prominent phenotype of the neurodegenerative disease than that at the time when the cell image IMG was captured.

For example, the pluripotent stem cells of a certain subject are induced to differentiate to prepare a plurality of nerve cells. A drug A that promotes cell death is administered to the plurality of nerve cells prepared in this manner, so as to make the same environment as that in the brain of a patient with Alzheimer's disease. After this, a drug B (for example, caspase inhibitor Z-VAD-FMK; n=48) that suppresses cell death is administered to some nerve cells among the plurality of nerve cells to which the drug A is administered, and a drug C that does not suppress cell death but causes dead cells to fluoresce is administered to the remaining nerve cells.

In this manner, regarding images of each of the nerve cells in a group to which the drug B is administered and the nerve cells in a group to which the drug C is administered, images are captured in a time series as time passes. The information (for example, a score of 0.0) indicating that the cells do not die is associated with the cell image IMG of the nerve cells in the group to which the drug B is administered as a teaching label, and the information (for example, a score of 1.0) indicating cell death is associated with the cell image IMG of the nerve cells in the group to which the drug C is administered as a teaching label.

In this manner, when the plurality of cell images IMG with which the teaching labels are associated are generated as the training data, the image processor 114 crops the cell images IMG to generate the plurality of cropped images IMG (step S202).

Figure 7:
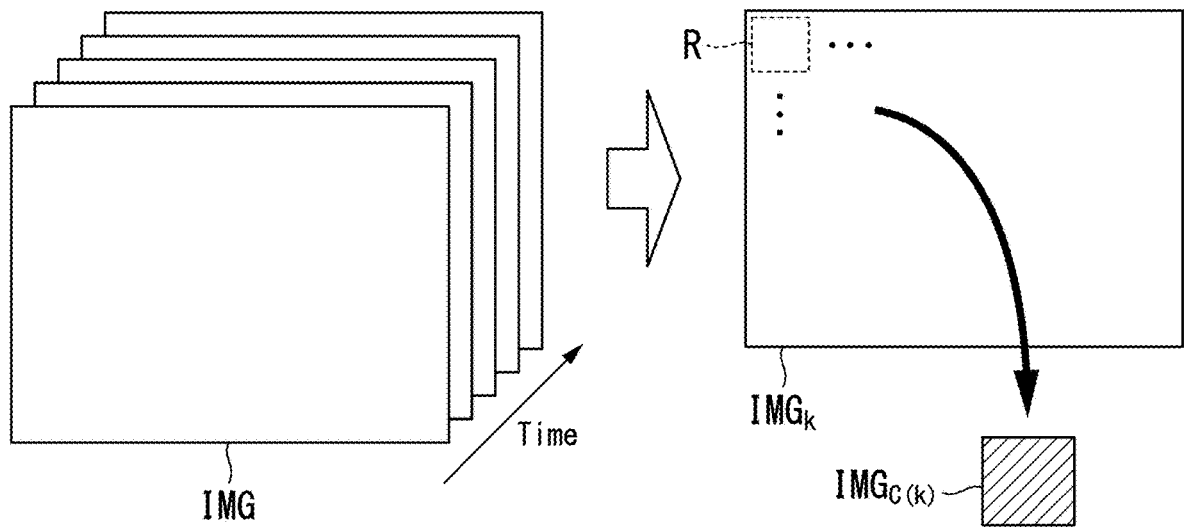
FIG. 7 is a view showing a generation method of the cropped image.

FIG. 7 is a view showing a generation method of the cropped image $IMG_C$. For example, the image processor 114 selects one cell image $IMG_k$ from a cell image group captured in a time series for a certain nerve cell. The image processor 114 generates a plurality of cropped images $IMG_C$ (k) by scanning the region R of a predetermined aspect ratio while sliding the region R on the selected cell image $IMG_k$, and by cutting out the pixel region overlapping the region R as the cropped image $IMG_C$. The image processor 114 reselects a cell image $IMG_{k+1}$, which is different from the previously selected cell image $IMG_k$, from the cell image group captured in a time series, and generates a plurality of cropped images $IMG_{C(k+1)}$ in the same manner. The image processor 114 may perform the same image processing on the cell image group captured in a time series for other nerve cells, and generate the plurality of cropped images $IMG_C$. The teaching labels of the cell images IMG from which the images are cut out are associated with each of a large number of cropped images $IMG_C$. By increasing the number of images used to train the prediction model MDL in this manner, the prediction accuracy of the prediction model MDL is improved.

Description will return to the flowchart in FIG. 6. Next, the learner 120 divides the plurality of cropped images $IMG_C$ generated from the cell images IMG of the training data by the image processor 114 into a training cropped image $Tr\_IMG_C$ and a validation cropped image $Va\_IMG_C$, and inputs the training cropped image $Tr\_IMG_C$ to an i-th model WL-i among the K models WL included in the prediction model MDL as weak learners (step S204). The parameters of the i-th model WL-i (such as the weights or bias components described above, the kernel of a convolutional layer, and the like) may be any initial value.

Next, the learner 120 acquires the output result, that is, the score $s_i$, from the i-th model WL-i to which the training cropped image $Tr\_IMG_C$ is input (step S206).

Next, the learner 120 computes the error (also referred to as loss) between the score $s_i$ acquired from the i-th model WL-i and the score associated with the training cropped image $Tr\_IMG_C$ as a teaching label (step S208).

Next, the learner 120 determines the parameters of the i-th model WL-i such that the error becomes small, based on a gradient method such as error inverse propagation (step S210).

Next, the learner 120 determines whether or not the learning for the i-th model WL-i has been repeated a predetermined number of times E (for example, approximately 30 times) (step S212), and in a case where the predetermined number of times E has not been reached, the process returns to S204, and the same image as the training cropped image Tr_IMG$_C$ used for the learning in the previous processing is input to the i-th model WL-i to repeatedly learn the i-th model WL-i. In this case, the learner 120 stores the parameters updated by the learning in the storage 130, and inputs the training cropped image Tr_IMG$_C$ to the i-th model WL-i of which parameters are initialized. Accordingly, the E models WL-i having different parameters from each other are generated until the time when the learning for the i-th model WL-i reaches a predetermined number of times E.

Meanwhile, in a case where the learner 120 reaches the predetermined number of times E of learning for the i-th model WL-i, the validation cropped image Va_IMG$_C$ is input to each of the E i-th models WL-i (step S214).

Next, the learner 120 selects the model WL-i having the highest prediction accuracy among the E i-th models WL-i (step S216). For example, among the E i-th models WL-i, the learner 120 selects the model WL-i that has the smallest error between the score $s_i$ obtained when the validation cropped image Va_IMG$_C$ is input and the score of the teaching label.

Next, the learner 120 determines whether or not all of the K models WL included as weak learners in the prediction model MDL have been learned (step S218), and in a case where the K models WL have not yet been learned, the process returns to S204, and the (i+1)th model WL-(i+1) is learned based on the training cropped image Tr_IMG$_C$.

Meanwhile, in a case where the learner 120 has learned all of the K models WL, the process of this flowchart is ended.

According to the above-described first embodiment, the information processing device 100 inputs the images acquired by imaging the cells differentiated from pluripotent stem cells derived from the subject to a prediction model MDL learned based on training data in which information indicating at least a neurodegenerative disease is associated with the image obtained by imaging the cells of the neurodegenerative disease differentiated from pluripotent stem cells as a teaching label, and predicts an onset of the neurodegenerative disease of the subject based on output results of the prediction model MDL to which the images were input. Therefore, it is possible to accurately predict the disease of the subject in the future.

In general, even in a case of cell images of cells in which a phenotype (for example, cell death) of a neurodegenerative disease will appear at some point in the future, it is difficult to observe changes in phenotype in cell images in the early stages when the neurodegenerative disease has not developed. On the other hand, in the present embodiment, since the prediction model MDL including the plurality of models WL implemented by the CNN is used, it is possible to expect that features such as minute changes in the cell structure and relative positional relationships between the cells, which are difficult to observe with the naked eye in the cell images, can be calculated as convolutional feature amounts in the hidden layer. As a result, neurodegenerative diseases can be detected at an early stage at which they cannot be caught by human visual checking of cell images.

Furthermore, according to the above-described first embodiment, the prediction model MDL is used to predict the appearance of the phenotype of the neurodegenerative disease in the cells, and thus, in a case where it is predicted that such a phenotype appears, the cells can be observed from the prediction time until the phenotype actually appears. As a result, for example, it can be expected that the cause of onset of the neurodegenerative disease will be able to be investigated. By observing the cells for a time period until the phenotype actually appears while administering various drugs to the cells predicted to develop a phenotype, it can be expected that a mechanism of the administered drug will be able to be elucidated. For example, if the result of administering a drug expected to suppress the onset of a neurodegenerative disease to cells in which the appearance of a phenotype is expected, is that it is observed that, contrary to the predicted result, the phenotype does not appear or its appearance takes a longer time, it can be understood that there is a high probability that the administered drug has an effect of suppressing the onset of the neurodegenerative disease.

Furthermore, according to the above-described first embodiment, the plurality of models WL included in the prediction model MDL as weak learners are ensemble-learned, and thus, the prediction model MDL having a high prediction accuracy can be generated.

Modification Example of First Embodiment

Hereinafter, a modification example of the first embodiment will be described. In the above-described first embodiment, it is described that the training data is the data in which the score indicating whether the nerve cells will die or not at some point in the future is associated with the cell image, as a teaching label, but the present invention is not limited thereto. For example, the training data may be data in which, in addition to the above-described score, the time period from the time (an example of a first time) when the cell images are captured to the time (an example of a second time) when the cells are predicted to die is further associated with the cell images, as a teaching label. By using such training data, the learner 120 learns the prediction model MDL such that, when the cell images are input, a three-dimensional vector (=[P1, P2, t]) of which the probability P1 of cell death, the probability P2 that the cell will not die, and a time period t to the cell death are respectively considered elements. The predictor 116 predicts the time period until the subject develops Alzheimer's disease based on the elements of t in the vector output by the prediction model MDL.

The teaching label is not limited to the score indicating the presence or absence of cell death at some point in the future or the time period to the cell death, but may also include attributes of the subject from whom the pluripotent stem cells were extracted before the differentiation of the nerve cells. Attributes may include a variety of information, such as sex, age, weight, height, lifestyle, presence or absence of disease, and family medical history. By learning the prediction model MDL using the cell images with which such teaching labels are associated, it is possible to generate the prediction model MDL having even higher prediction accuracy. As a result, by inputting the attributes of the subject to the prediction model MDL in addition to the cell images at runtime, it is possible to more accurately predict the future diseases of the subject.

The plurality of models WL included as weak learners in the prediction model MDL is not limited to the CNN, but may also include, for example, a recurrent neural network (RNN) of which the intermediate layer is a long short-term memory (LSTM). Specifically, the model WL can be Pred-Net, which is a combination of the RNN and the CNN.

PredNet is a neural network that predicts a frame image at a future time later than a certain time, from the frame image at the certain time.

Second Embodiment

Hereinafter, a second embodiment will be described. The second embodiment describes a screening device 100A that determines whether or not a test substance is a preventive or a therapeutic agent for the neurodegenerative diseases based on the output results of the prediction model MDL. Hereinafter, the following description focuses on the differences from the first embodiment, and the points in common with the first embodiment will be omitted. In the description of the second embodiment, the same reference numerals will be given to the same parts as those of the first embodiment.

Figure 8:
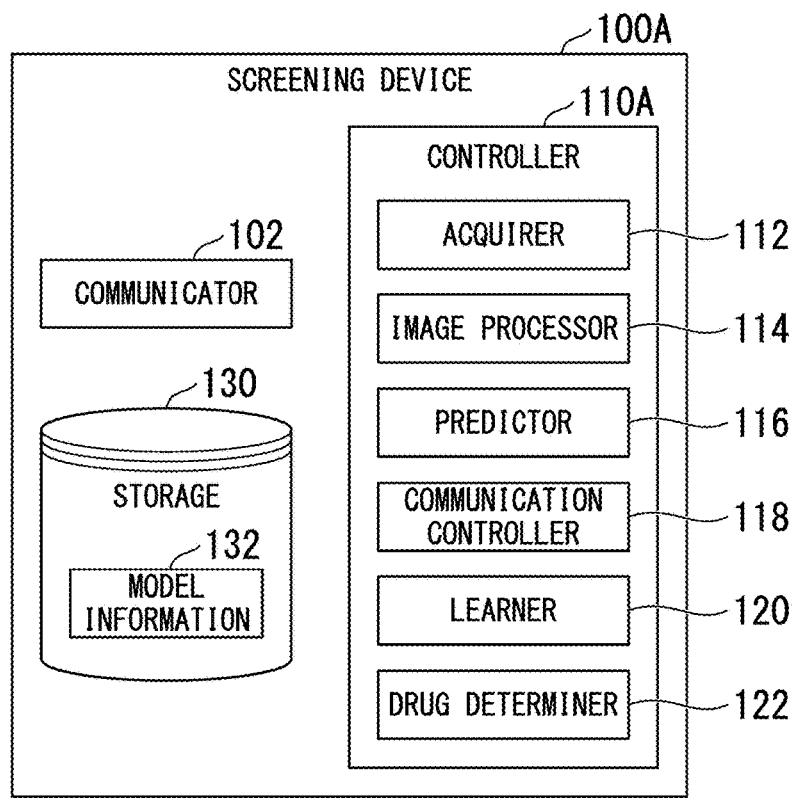
FIG. 8 is a view illustrating an example of a configuration of a screening device according to a second embodiment.

FIG. 8 is a view illustrating an example of a configuration of the screening device 100A according to the second embodiment. As illustrated in the drawing, the screening device 100A includes the configuration of the information processing device 100 according to the above-described first embodiment. Specifically, the screening device 100A includes the communicator 102, a controller 110A, and the storage 130.

The controller 110A according to the second embodiment further includes a drug determiner 122 in addition to the above-described acquirer 112, image processor 114, predictor 116, communication controller 118, and learner 120.

The acquirer 112 according to the second embodiment acquires images obtained by imaging cells of neurodegenerative diseases, which are in contact with a test substance and differentiated from pluripotent stem cells. The test substance is not particularly limited, and examples thereof include natural compound libraries, synthetic compound libraries, existing drug libraries, metabolite libraries, and the like. In the present embodiment, a preventive for the neurodegenerative disease is a drug that can suppress the onset of the neurodegenerative disease or reduce the symptoms when administered to a target before the onset of the neurodegenerative disease. A therapeutic agent for the neurodegenerative disease is a drug that can reduce the symptoms of the neurodegenerative disease when administered to a patient after the onset of the neurodegenerative disease.

The learner 120 according to the second embodiment learns the prediction model MDL based on the training data in the same manner as that of the above-described first embodiment. The training data according to the second embodiment is data in which a phenotype such as cell death is associated with the cell image obtained by imaging the cells of the neurodegenerative disease, such as Alzheimer's disease, differentiated from pluripotent stem cells, as a score. Accordingly, the prediction model MDL outputs the appearance of the phenotype of the neurodegenerative disease in the cells as a score when the cell images are input.

The predictor 116 according to the second embodiment inputs the images acquired by the acquirer 112 to the prediction model MDL that has been learned. In addition, the predictor 116 predicts whether or not the phenotype of the neurodegenerative disease will appear in the cells to which the test substance was administered, based on the output results of the prediction model MDL to which the images were input.

The drug determiner 122 determines whether the test substance is a preventive or a therapeutic agent for the neurodegenerative diseases based on the prediction results of the predictor 116.

For example, the drug determiner 122 may determine that the test substance is a preventive or a therapeutic agent for the neurodegenerative diseases in a case where the following condition (1) is satisfied, and may determine that the test substance is neither a preventive nor a therapeutic agent for the neurodegenerative diseases in a case where the condition (2) is satisfied.

Condition (1): The score output by the prediction model MDL to which the image is input is equal to or less than a threshold value, and it is predicted that the phenotype of the neurodegenerative disease will not appear in the cells to which the test substance is administered.

Condition (2): The score output by the prediction model MDL to which the image is input is equal to or greater than a threshold value, and it is predicted that the phenotype of the neurodegenerative disease will appear in the cells to which the test substance is administered.

According to the above-described second embodiment, the screening device 100A acquires images obtained by imaging cells of neurodegenerative diseases differentiated from pluripotent stem cells that have been in contact with the test substance, inputs the acquired images to the prediction model MDL that has been learned, and predicts whether or not the phenotype of the neurodegenerative disease will appear in the cells to which the test substance is administered based on the output results of the prediction model MDL to which the images are input. In addition, the screening device 100A determines whether the test substance is a preventive or a therapeutic agent for the neurodegenerative diseases based on the prediction results of whether or not the phenotype appears in the cells. As a result, based on the images of the cells differentiated from pluripotent stem cells, it is possible to predict whether or not the phenotype of the neurodegenerative disease will appear, and furthermore, to efficiently discover new drugs that can be a preventive or a therapeutic agent for the neurodegenerative diseases.

<Hardware Configuration>

Figure 9:
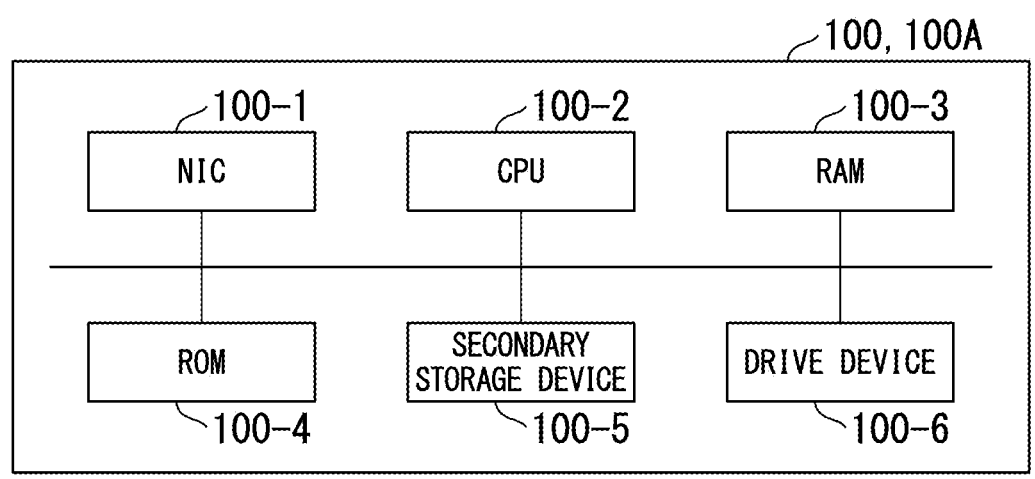
FIG. 9 is a view illustrating an example of a hardware configuration of the information processing device and the screening device of the embodiments.

The information processing device 100 and the screening device 100A of the above-described embodiments are realized, for example, by a hardware configuration as illustrated in FIG. 9. FIG. 9 is a view illustrating an example of the hardware configuration of the information processing device 100 and the screening device 100A of the embodiments.

The information processing device 100 has a configuration in which a NIC 100-1, a CPU 100-2, a RAM 100-3, a ROM 100-4, a secondary storage device 100-5 such as a flash memory or an HDD, and a drive device 100-6 are connected to each other by an internal bus or a dedicated communication line. A portable storage medium, such as an optical disk, is attached to the drive device 100-6. A program stored in a portable storage medium attached to the secondary storage device 100-5 or the drive device 100-6 is expanded into the RAM 100-3 by a DMA controller (not illustrated) or the like, and executed by the CPU 100-2 to realize the controllers 110 and 110A. The program that the controller 110 or 110A refers to may be downloaded from another device via the network NW.

Expression Example 1

The above-described embodiments can be expressed as follows.

An information processing device including: a processor; and a memory for storing a program, the device configured to, by executing the programs by the processor, acquire images obtained by imaging cells differentiated from pluripotent stem cells derived from a subject, and input the acquired images to a model trained on data in which information indicating at least a neurodegenerative disease is associated with the image obtained by imaging the cells of the neurodegenerative disease differentiated from pluripotent stem cells, and predict an onset of the neurodegenerative disease of the subject or effects of drugs on the neurodegenerative disease, based on output results of the model to which the images were input.

Expression Example 2

The above-described embodiments can also be expressed as follows.

A screening device including: a processor; and a memory for storing the program, the device configured to, by executing the programs by the processor, acquire images obtained by imaging cells of a neurodegenerative disease, which are in contact with a test substance and differentiated from pluripotent stem cells, inputs the acquired images to a model trained on data in which information indicating at least a phenotype of the neurodegenerative diseases is associated with an image obtained by imaging the cells of the neurodegenerative disease differentiated from pluripotent stem cells, and predict whether or not the phenotype of the neurodegenerative disease will appear in the cells of the neurodegenerative disease differentiated from pluripotent stem cells, based on the output results of the model to which the images were input, and determine whether the test substance is a preventive or a therapeutic agent for the neurodegenerative disease based on prediction results.

Above, although the aspects for carrying out the present invention have been described using the embodiments, the present invention is not limited to the above-described embodiments, and various modifications and substitutions can be made without departing from the gist of the present invention.

EXAMPLE

Experiment Example 1

(Establishment of Human iPS Cells)
Reprogramming factors were introduced into human peripheral blood mononuclear cells using an episomal vector. SOX2, KLF4, OCT4, L-MYC, LIN28, and dominant-negative p53 were used as reprogramming factors. After a few days, the cells were recovered and seeded onto dishes coated with iMatrix (Nippi. Inc.). The next day, the medium was replaced with StemFit AK03 (Ajinomoto Co., Inc.). Thereafter, the medium was replaced every two days. Twenty days after the introduction of the reprogramming factors, colonies of iPS cells were recovered and expansively cultured.

Experiment Example 2

(Nerve Cell Preparation)
Direct conversion technology was used to differentiate the iPS cells established in Experiment Example 1 into nerve cells. The cDNA of the human neurogenin 2 (NGN2) gene under the tetracycline-inducible promoter (tetO) was introduced into the iPS cells using the piggyBac transposon system and Lipofectamine LTX (Thermo Fisher Scientific Inc.). tetO: a vector containing NGN2 was used. After the antibiotic selection of G418 disulfate (Nacalai Tesque Inc.), colonies were selected and subclones that could efficiently differentiate into nerve cells were selected by inducing transient expression of NGN2.

Experiment Example 3

(Live Imaging Detection of Caspase-3)
Activated caspase-3 in apoptotic nerve cells was detected by using a fluorogenic substrate consisting of a four-amino acid peptide DEVD (SEQ ID NO: 1) bound to a nucleic acid binding dye (product name "CellEvent Caspase-3/7 Green Detection Reagent", Thermo Fisher Scientific Inc.). Since the DEVD peptides inhibit the binding of fluorescent dyes to DNA, the above-described fluorogenic substrate is essentially non-fluorescent. However, when activated caspase-3 in dead cells cleaves the DEVD peptide, a fluorescent dye binds to the DNA to cause fluorescence, which can be detected using a standard FITC green filter set of a standard time lapse imaging system (product name "Incucyte ZOOM", Essen Bioscience, Ltd.) (exposure time 400 ms). Images were photographed over time every 6 hours after drug administration.

Experiment Example 4

(Training Data Preparation)
The original size of the single-well image captured by using the time lapse imaging system (product name "Incucyte ZOOM", Essen Bioscience, Ltd.) was 1,392×1,038 pixels, and four images were cut out from this image and extracted as the cropped image $IMG_C$. The original image was divided evenly into four regions, and square images were taken out from the center of each region. The size of the trimmed cropped image $IMG_C$ was selected from 128×128, 256×256, 512×512, 768×768, and 1,020×1,020 in width×height. Since the size of the original image is 1,392×1,038, in a case where the crop size is greater than 519×519, the crop region R protrudes from the original image. In this case, the crop region R was moved to match the end of the original image.

Images acquired from wells to which Z-VAD-FMK (Promega Corporation), which is a caspase-3 inhibitor, was administered to the nerve cells, were classified as "alive" class or "1". The images acquired from wells to which the caspase-3 inhibitor was administered were classified as "dead" class or "0". In other words, the teaching label indicating that the nerve cell is "alive" is associated with the images acquired from the wells to which the caspase-3 inhibitor was administered, and the teaching label indicating that the nerve cell is "dead" is associated with the images acquired from the wells to which the caspase-3 inhibitor was administered.

The experiment was conducted using three 96-well plates. Of the three plates, the wells in column A and column L of two plates 24 to 48 hours after drug application in the group to which dimethyl sulfoxide (DMSO) was administered and the group to which Z-VAD-FMK (Promega Corporation) was administered were used for the training dataset (480 images per class) and the wells in the remaining columns were used for the validation dataset (160 images per class). The image of the remaining one plate 24 hours after drug application was used as a test dataset (64 images per class).

Experiment Example 5

(Training, Validation, Testing)
The construction, training, validation, and testing of the prediction model MDL will be described. The deep learning framework PyTorch (https://pytorch.org/) was used to construct, train, validate, and test the prediction model MDL. As the architecture of the neural network, an inception-v3 model was used as the model (weak learner) WL. A fine-tuning approach, which is useful in a case where the number of training samples is limited, such as medical or biological data, was employed. The neural network was pre-trained on the ImageNet dataset. The ImageNet dataset includes 1.2 million labeled images of objects classified into 1,000 categories. The number of nodes in the last fully-connected (FC) layer of the pre-trained neural network was adjusted to the number of classes (=2), and the weights in all layers were re-optimized during the training phase. The 256×256 pixel image for training was randomly flipped horizontally with a 50% probability, and then a 224×224 pixel region was randomly taken out from the image. The taken-out 224×224 pixel image was finally used as input to the neural network. Cross entropy was used as a loss function. Errors were back-propagated through the network and weights were optimized by Stochastic Gradient Descent (SGD) using mini-batches. The momentum coefficient in the SGD was set to 0.9.

The classification accuracy was calculated at each epoch for the validation data (the validation cropped image $Va\_IMG_C$). The epoch is iteration processing when learning the model WL repeatedly until a predetermined number of times E is reached. The parameters of the network at the epoch when the network showed the best classification accuracy were saved for each training trial. In other words, E parameters were saved.

For example, twenty training trials were performed while E=20. According to this, 20 parameters were saved. First, a mini-batch size B was set to 16 and the learning rate of the SGD was set to lr=0.001, then the average accuracy was evaluated for the validation data of twenty trials at various crop sizes (width×height). After fixing the crop size, by evaluating the accuracy for validation, a grid search was executed over mini-batch sizes B={4, 8, 16, 32} and learning rates lr={0.0005, 0.001, 0.0015, 0.002} to evaluate the certainty to the validation data.

For the prediction test, the average output (normalized score) from the last fully-connected layer of the 20 trained networks was used to classify the test data. In both the validation data and the test data, the 224×224 pixel image was trimmed without flipping from the center of the resized 256×256 pixel image. Accuracy in receiver operating characteristic (ROC) analysis, F1 score, and area under the curve (AUC) were calculated and validated by 3-way cross-validation. The plates of each dataset were rotated and the average of the results of three trials was calculated to evaluate the certainty for the validation data.

The above-described methods for machine learning are only examples, and other well-known methods can be adopted. For example, as an error minimization, AdaGrad, RMSprop, AdaDelta, Adaptive moment estimation (Adam) or the like may be used instead of SGD.

Experiment Example 6

(Study on Coating for Cell Culture Vessel)

The coating of cell culture vessel suitable for long-term observation of nerve cells differentiated from iPS cells was studied.

As nerve cells, nerve cells obtained by inducing transient expression of NGN2 in the cells selected in Experiment Example 2 were used. As coating agents, Poly-D-Lysine (PDL, Sigma-Aldrich Corporation Inc.) at a final concentration of 1% (v/v), Matrigel (Corning Inc.) at a final concentration of 2% (v/v), Synthemax II SC (Corning Inc.) at a final concentration of 2% (v/v), and CellNest (Fujifilm Holdings Corporation) at a final concentration of 1% (v/v) were used in various combinations. For comparison, the same study was conducted on culture dishes without coating.

The nerve cells were seeded onto the 96-well plates with various coatings, and the states of the cells after one day and ten days were observed under a microscope. FIG. 10 is a view illustrating a photomicrograph photographed after one day, and FIG. 11 is a view illustrating a photomicrograph photographed after ten days.

In FIGS. 10 and 11, a case of being coated with PDL (Sigma-Aldrich Corporation Inc.) is indicated as "P", a case of being coated with Matrigel (Corning Inc.) is indicated as "M", a case of being coated with Synthemax II SC (Corning Inc.) is indicated as "S", and a case of being coated with CellNest (Fujifilm Holdings Corporation) is indicated as "C". A case of being coated with PDL (Sigma-Aldrich Corporation Inc.) and Matrigel (Corning Inc.) is indicated as "PM", and the same is also employed for other combinations of coating agents. A case of being coated with PDL (Sigma-Aldrich Corporation Inc.), Matrigel (Corning Inc.), and Synthemax II SC (Corning Inc.) is indicated as "PMS", and the same is also employed for other combinations of coating agents. A case where coating was not performed is indicated as "Non".

As a result, it was found that the PMSC-coated cell culture vessel, that is, the cell culture vessel coated with a mixture of PDL (Sigma-Aldrich Corporation Inc.) at a final concentration of 1% (v/v), Matrigel (Corning Inc.) at a final concentration of 2% (v/v), Synthemax II SC (Corning Inc.) at a final concentration of 2% (v/v), and CellNest (Fujifilm Holdings Corporation) at a final concentration of 1% (v/v) was most suitable for long-term observation of nerve cells.

Experiment Example 7

Figure 12:
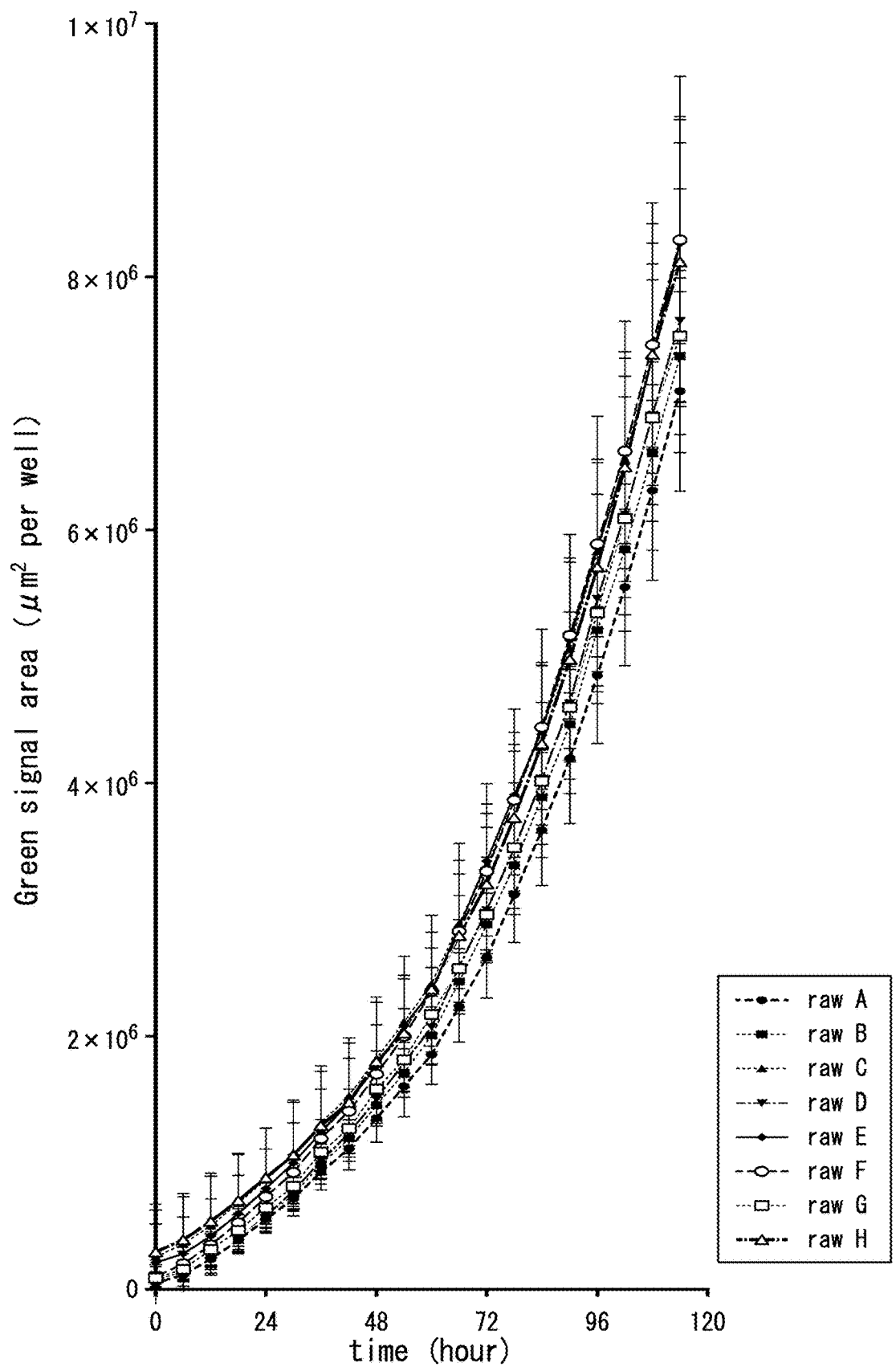
FIG. 12 is a view illustrating an example of results of bioassay.

The degree of activation of caspase-3 was checked using the 96-well plate. FIG. 12 is a view illustrating an example of results of bioassay. For all wells in column A through column H of the plate, the area of the green fluorescent region on the nerve cell image (hereafter, referred to as a green signal area) was computed, and the average value of the green signal area was computed for each column in column A through column H. The green signal area is an area of the region where cell death occurred. In addition, the change over time in the average value of the green signal area was plotted on a graph. The results showed no significant differences between the columns, indicating the stability of the assay.

Figure 13:
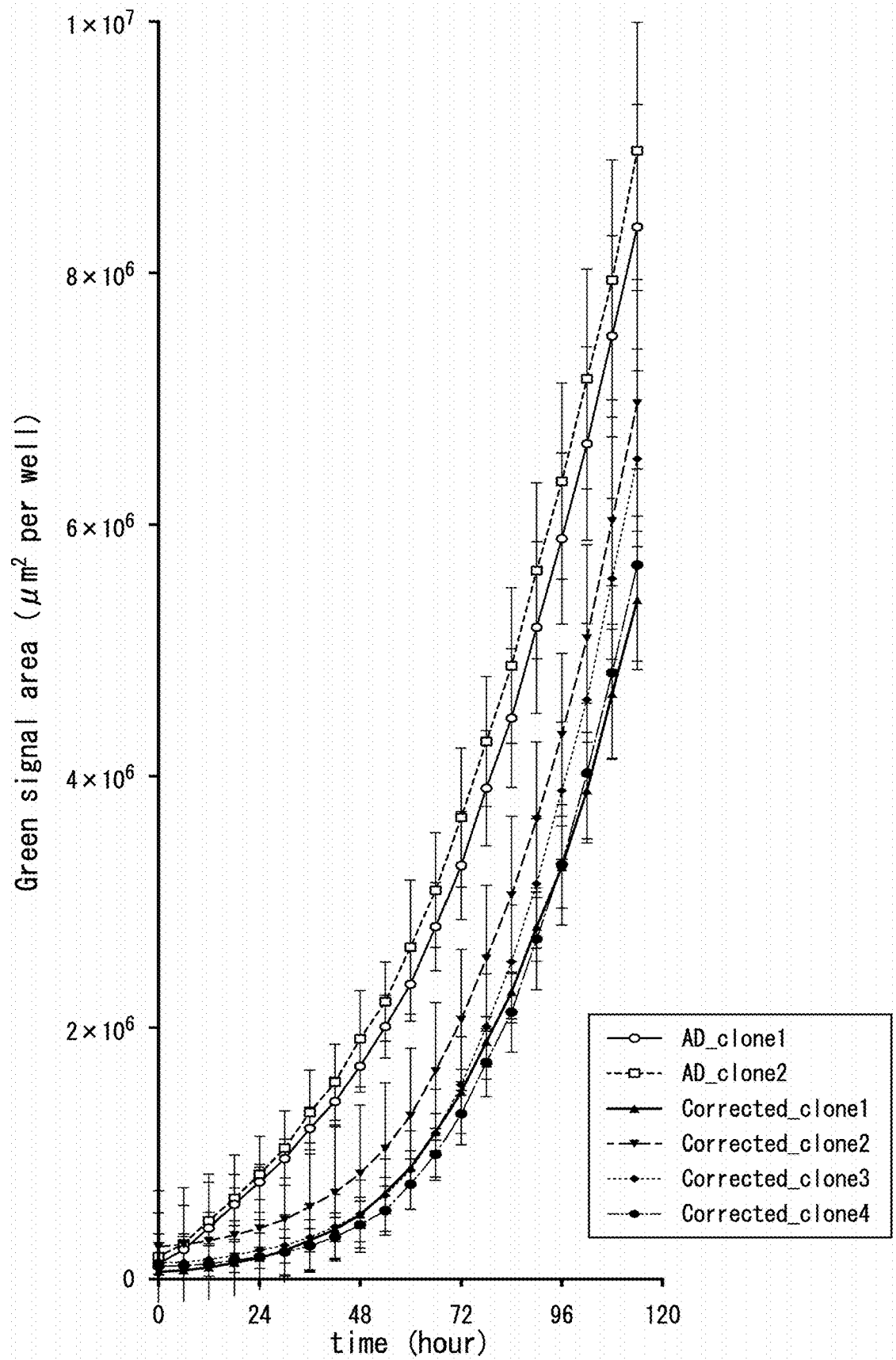
FIG. 13 is a view illustrating an example of results of applying genetic modification technology.

FIG. 13 is a view illustrating an example of results of applying genetic modification technology. Familial Alzheimer's disease is known to be caused by gene PSEN1 G384A mutation. AD_clone 1 and AD_clone 2 in the drawing represent the changes over time in the green signal area of the nerve cell image in which the PSEN1 G384A mutation occurred. Corrected_clones 1 to 4 represent the changes over time in the green signal area when mutations are normalized to a wild type by using the genetic modification technology with respect to the nerve cells in which the PSEN1 G384A mutation occurred. As illustrated in the drawing, the average value of the green signal area was smaller in Corrected_clones 1 to 4 than in AD_clone 1 and AD_clone 2, indicating that cell death was mitigated by the genetic modification technology.

Figure 14:
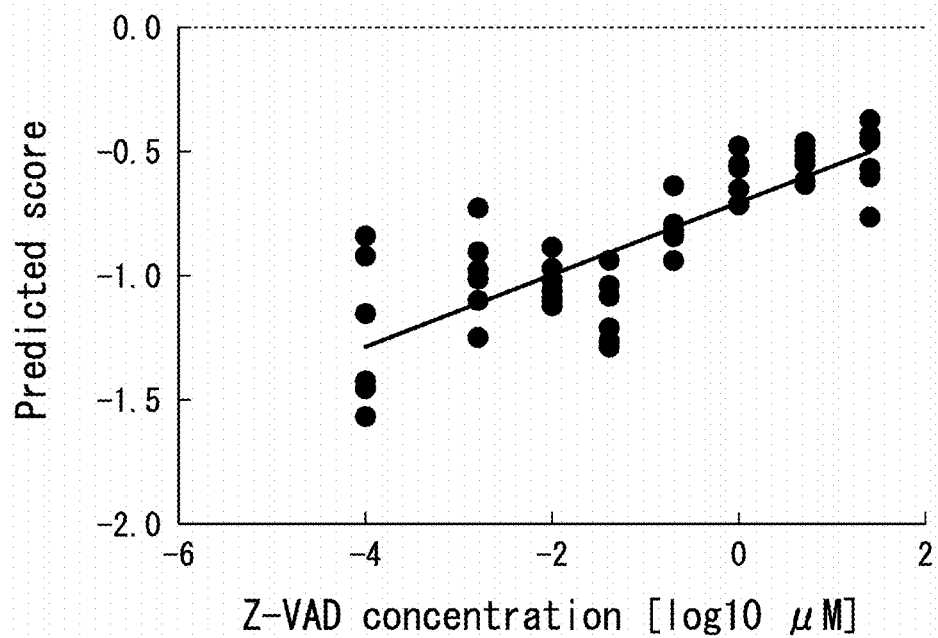
FIG. 14 is a view illustrating a relationship between Z-VAD-FMK concentration and a score of the prediction model.

FIG. 14 is a view illustrating a relationship between the Z-VAD-FMK concentration and the score of the prediction model MDL. The vertical axis in the drawing represents the score of the prediction model MDL, and the horizontal axis represents the Z-VAD-FMK concentration. As described above, the score represents a probabilistic value related to the life or death of cells. The higher the score, the greater the probability that the cell will survive, and the lower the score, the greater the probability that the caspase-3 of the cell will be activated or undergo apoptosis. As illustrated in the drawing, the correlation was shown in which the higher the Z-VAD-FMK concentration, the higher the score.

[Proposal of New Method]

Figure 15:
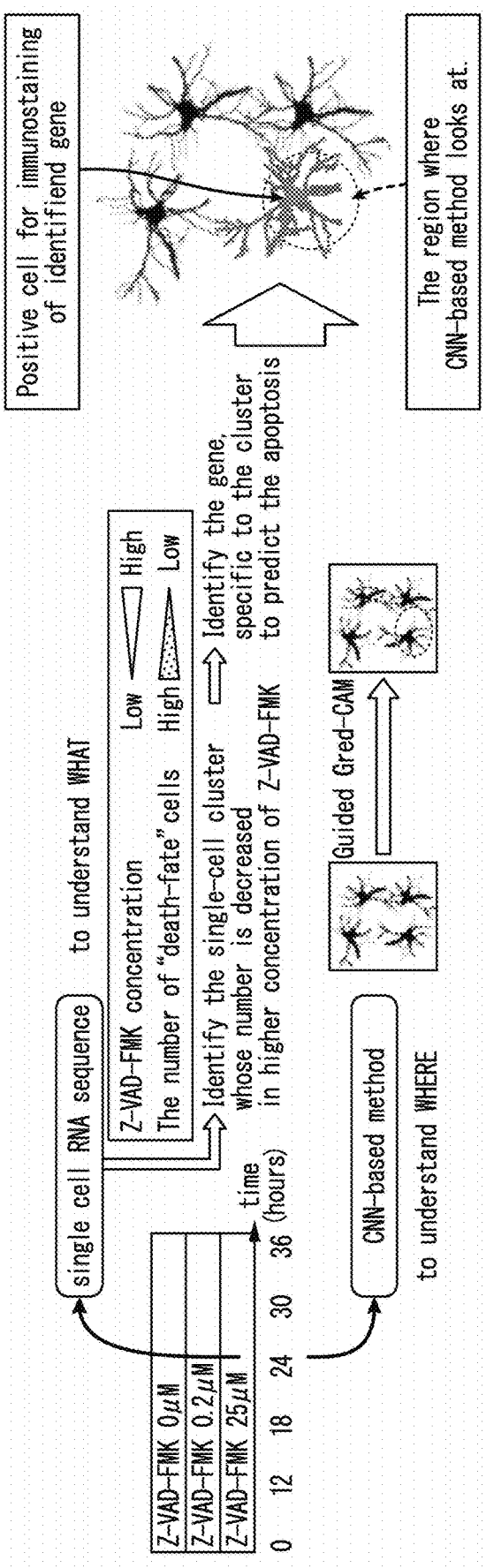
FIG. 15 is a view showing the schematics of a proposed method.

FIG. 15 is a view showing the schematics of a proposed method. As illustrated in the drawing, Z-VAD-FMK is added to nerve cells and changes in gene expression of individual cells are observed before cell death occurs (before caspase-3 activation occurs) (single cell RNA sequence=WHAT in the drawing). At the same time, the images are acquired, and the CNN-based prediction model MDL is used to check where the changes are occurring (WHERE in the drawing). In this manner, a method for identifying the molecules, where and what is occurring before cell death, is proposed.

Experiment Example 8

Figure 16:
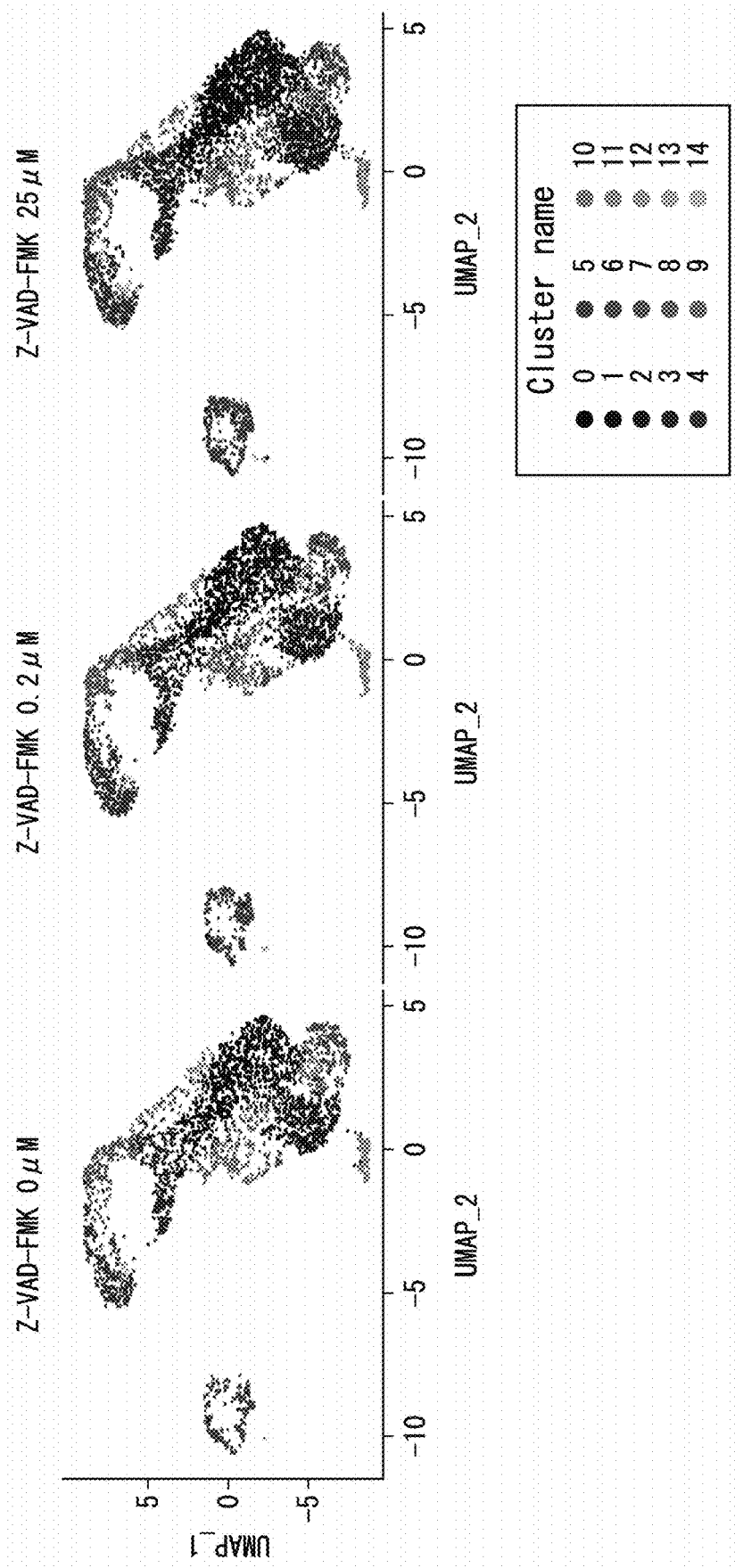
FIG. 16 is a view illustrating an example of clustering results of cells.

Single cell analysis was performed using the above-described proposed method. FIG. 16 is a view illustrating an example of clustering results of cells. While changing the concentration of Z-VAD-FMK added to the nerve cells to 0 [μM], 0.2 [μM], and 25 [μM], the cell population was separated into a total of 15 types of clusters ranging from 0 to 14 by using a visualization method (one type of dimensional compression method) which is called UMAP (uMAP).

Figure 17:
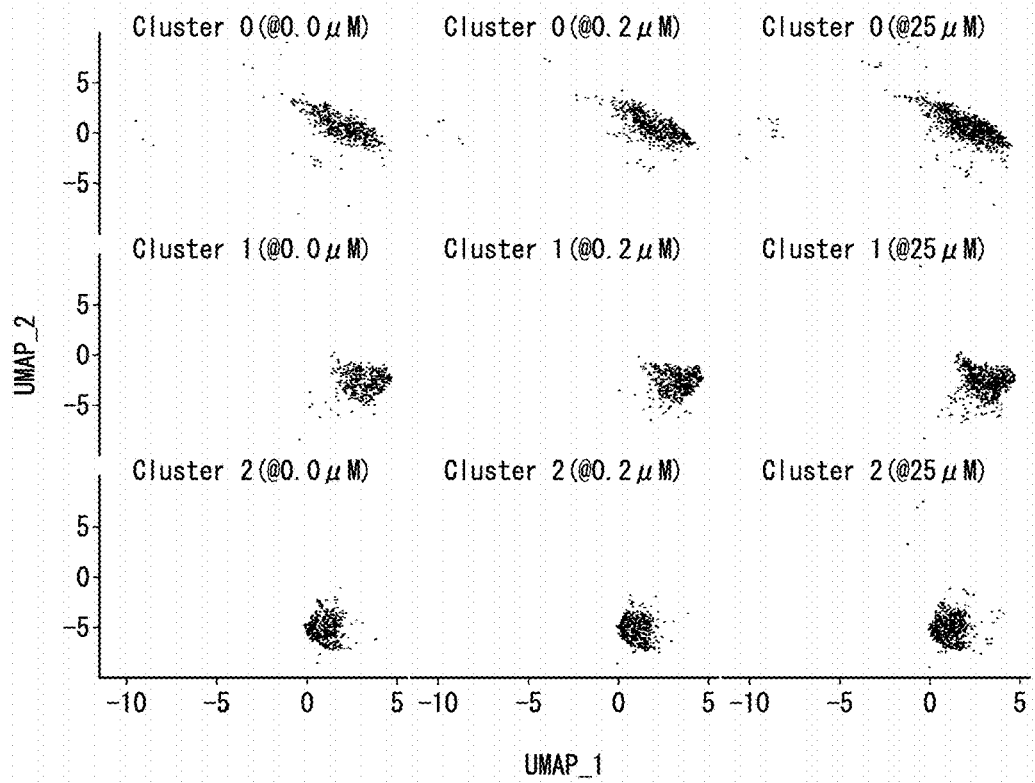
FIG. 17 is a view illustrating an example of clusters 0, 1, and 2.

FIG. 17 is a view illustrating an example of clusters 0, 1, and 2. In the drawing, the first row represents the cluster 0, the second row represents the cluster 1, and the third row represents the cluster 2. The first row represents that the concentration of Z-VAD-FMK is 0 [μM], the second row represents that the concentration of Z-VAD-FMK is 0.2 [μM], and the third row represents that the concentration of Z-VAD-FMK is 25 [μM].

Figure 18:
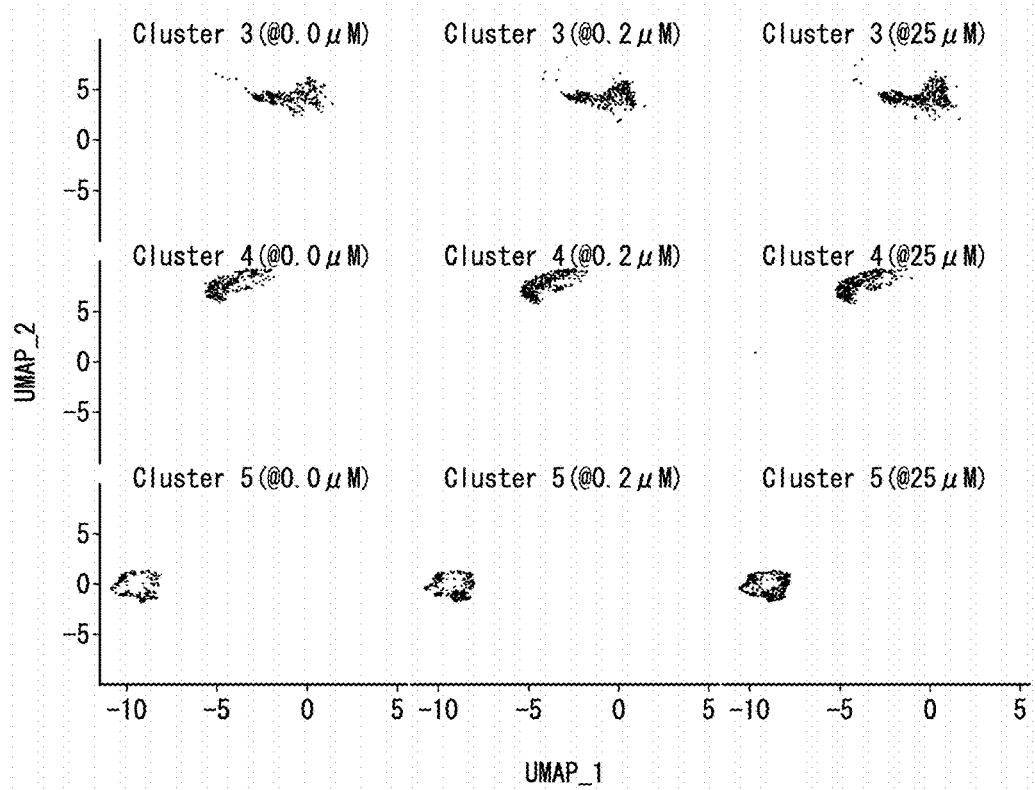
FIG. 18 is a view illustrating an example of clusters 3, 4, and 5.
Figure 19:
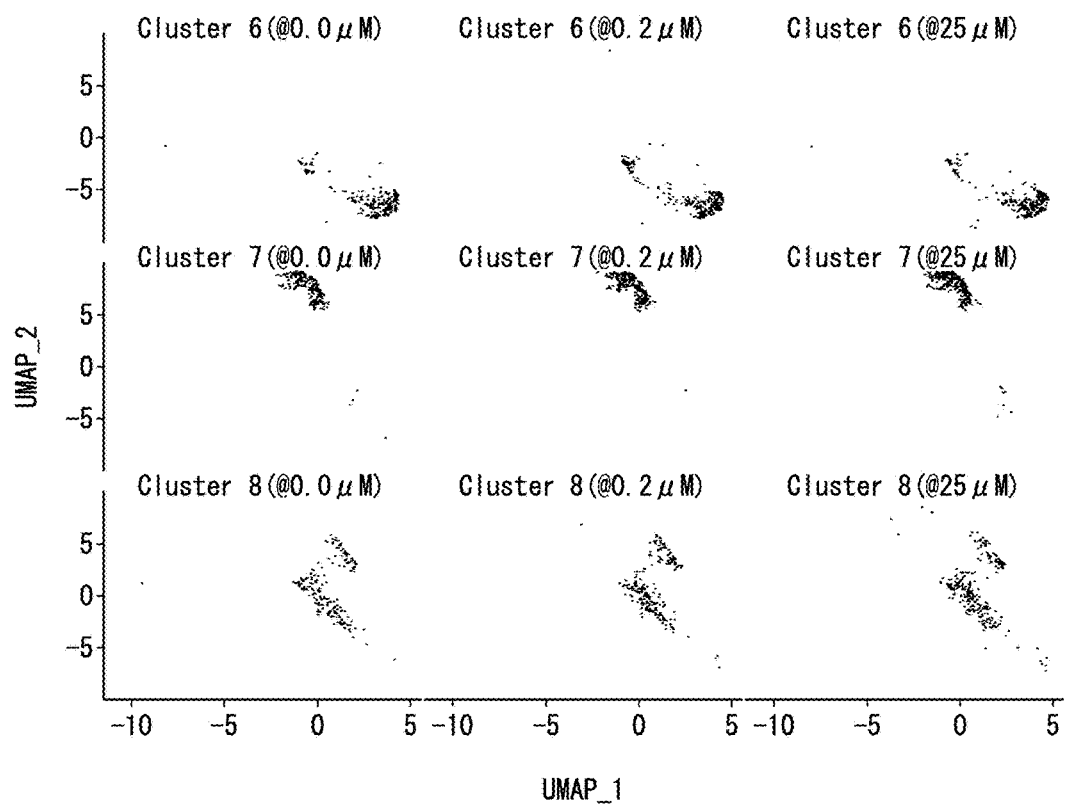
FIG. 19 is a view illustrating an example of clusters 6, 7, and 8.
Figure 20:
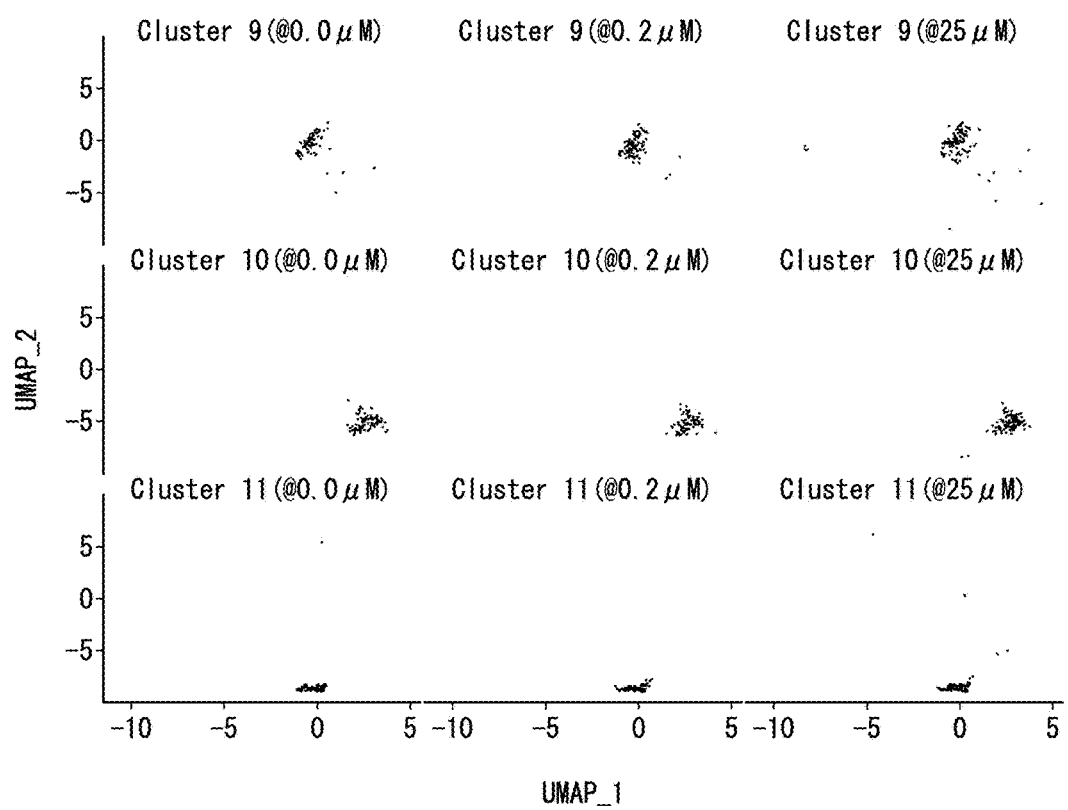
FIG. 20 is a view illustrating an example of clusters 9, 10, and 11.
Figure 21:
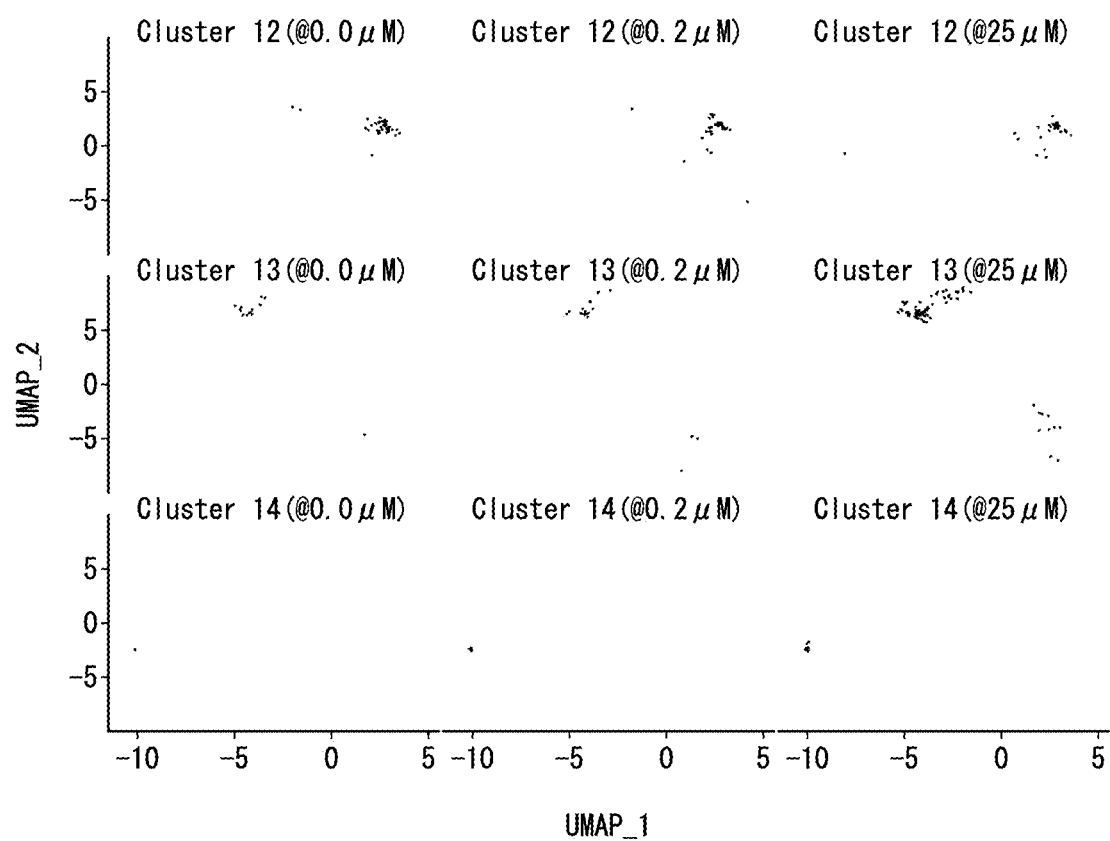
FIG. 21 is a view illustrating an example of clusters 12, 13, and 14.

FIG. 18 is a view illustrating an example of clusters 3, 4, and 5. In the drawing, the first row represents the cluster 3, the second row represents the cluster 4, and the third row represents the cluster 5. FIG. 19 is a view illustrating an example of clusters 6, 7, and 8. In the drawing, the first row represents the cluster 6, the second row represents the cluster 7, and the third row represents the cluster 8. FIG. 20 is a view illustrating an example of clusters 9, 10, and 11. In the drawing, the first row represents the cluster 9, the second row represents the cluster 10, and the third row represents the cluster 11. FIG. 21 is a view illustrating an example of clusters 12, 13, and 14. The first row in the drawing represents the cluster 12, the second row represents the cluster 13, and the third row represents the cluster 14. In the example in the drawings, similar to FIG. 17, the first row represents that the concentration of Z-VAD-FMK is 0 [μM], the second row represents that the concentration of Z-VAD-FMK is 0.2 [μM], and the third row represents that the concentration of Z-VAD-FMK is 25 [μM].

As can be seen from the cluster shapes of the UMAP expanded cell populations in FIGS. 16 to 21, most of the cell populations were identical in shape. In other words, the Z-VAD-FMK concentration had no effect on most of the cell populations.

Figure 22:
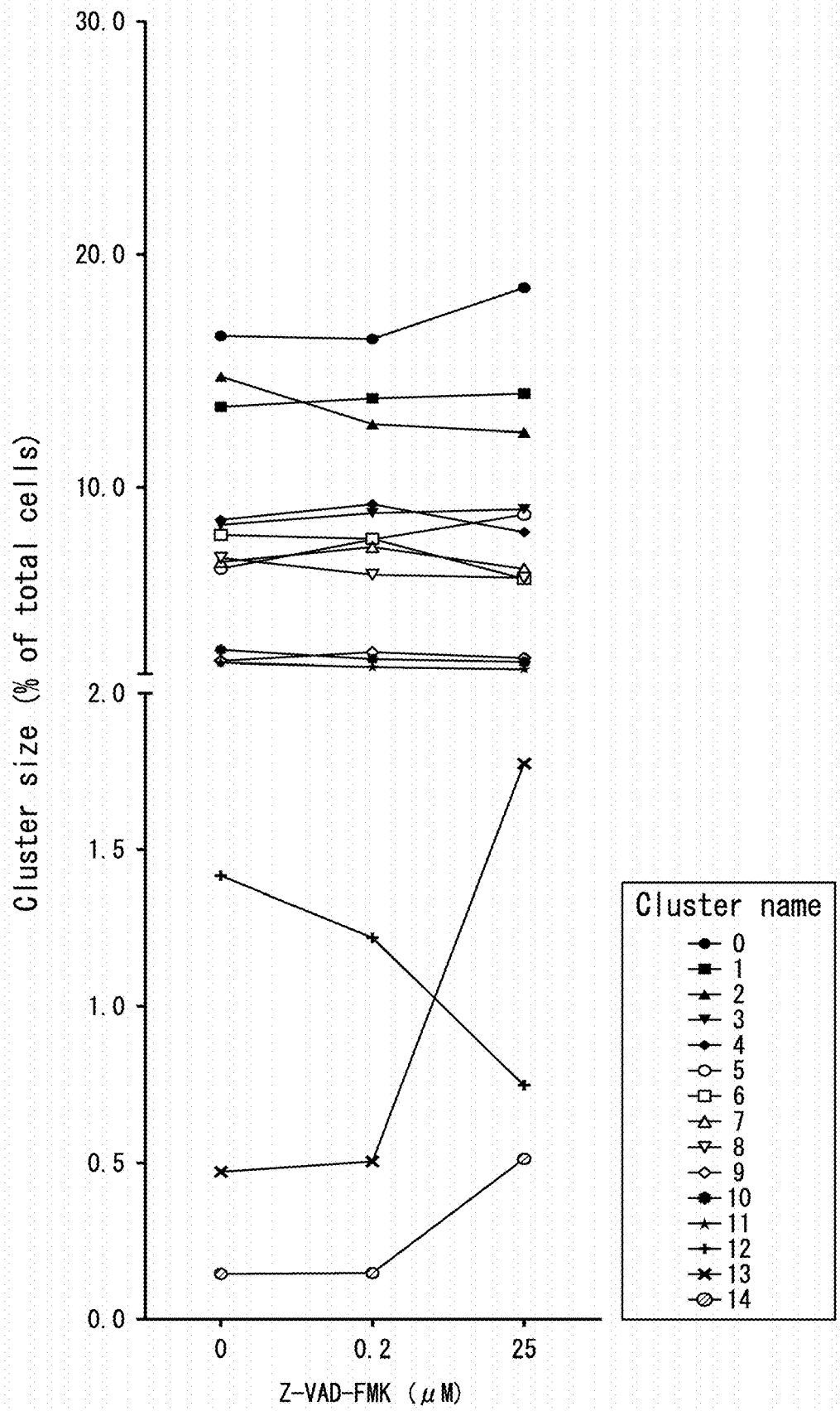
FIG. 22 is a view illustrating a relationship between Z-VAD-FMK concentration and a cluster size.

FIG. 22 is a view illustrating a relationship between the Z-VAD-FMK concentration and the cluster size. Among fourteen clusters, a cluster was searched that satisfies the following conditions: caspase-3 was activated, the proportion in the total cell death is only a few [%], and the number of cells in its own cluster decreased with the addition of Z-VAD-FMK (that is, suppression of apoptosis). As a result, the cluster 12 was identified as a cluster that satisfies the conditions.

The Pathway was analyzed in which a group of genes that are expressed with high specificity in the cluster 12 is contained. FIG. 23 is a view illustrating an example of analysis results of Pathway. As illustrated in the drawing, a case is illustrated that contributes to Pathway specifically related to high apoptosis and cell death in the cluster (that is, clusters that were heading toward cell death) in which the number of cells decreases with the addition of Z-VAD-FMK. Accordingly, the validity of the present experiment method is shown.

The invention claimed is:

1. An information processing device comprising:
   an acquirer configured to acquire images obtained by imaging cells differentiated from pluripotent stem cells derived from a subject; and
   a predictor configured to:
   input the images acquired by the acquirer to a neural network trained on training data in which information indicating at least a phenotype of neurodegenerative disease is associated with an image obtained by imaging cells of the neurodegenerative disease differentiated from the pluripotent stem cells, the training data used for training the neural network includes data in which at least information showing the phenotype of the neurodegenerative disease that is more prominent at a second time after a first time when the cells of the neurodegenerative disease were captured than that at the first time, is associated with the image obtained by imaging the cells of the neurodegenerative disease, and predict an onset of the neurodegenerative disease of the subject or effects of drugs on the neurodegenerative disease based on the information indicating the phenotype output by the neural network in response to the images input.

2. The information processing device according to claim 1, wherein:

the neural network outputs a score indicating a likelihood that the cells showed the phenotype when the images obtained by imaging the cells were input, and the predictor predicts the onset of the neurodegenerative disease of the subject based on the score output by the neural network.

3. The information processing device according to claim 2, wherein:

the training data used for training the neural network includes data in which a time period from the first time to the second time is further associated with the image obtained by imaging the cells of the neurodegenerative disease, the neural network outputs a time period until the cells will show the phenotype from when the images obtained by imaging the cells were input, and the predictor further predicts a time period until the onset of the neurodegenerative disease of the subject based on the time period output by the neural network.

4. The information processing device according to claim 1, wherein:

the training data used for training the neural network further includes data in which information that a cell does not show the phenotype of the neurodegenerative disease is associated with the image obtained by imaging the cells differentiated from the pluripotent stem cells derived from a healthy subject.

5. The information processing device according to claim 1, further comprising:

a learner configured to learn the neural network trained on the training data.

6. The information processing device according to claim 5, wherein:

the neural network includes a plurality of weak learners, and the learner ensemble-learns the plurality of weak learners.

7. The information processing device according to claim 6, wherein:

the predictor inputs the images acquired by the acquirer to each of the plurality of weak learners, and predicts the onset of the neurodegenerative disease of the subject based on the information indicating the phenotype output by each of the plurality of weak learners in response to the images input.

8. The information processing device according to claim 1, wherein:

the cells differentiated from the pluripotent stem cells are nerve cells, glial cells, vascular endothelial cells, pericytes, choroid plexus cells, or immune system cells, and the neurodegenerative diseases are Alzheimer's disease, Parkinson's disease, amyotrophic lateral sclerosis (ALS), spinocerebellar degeneration, frontotemporal lobar degeneration, Lewy body dementia, multiple system atrophy, Huntington's disease, progressive supranuclear palsy, or corticobasal degeneration.

9. A screening device comprising:

an acquirer configured to acquire images obtained by imaging cells of a neurodegenerative disease, which are in contact with a test substance and differentiated from pluripotent stem cells;

a predictor configured to:

input the images acquired by the acquirer to a neural network trained on training data in which information indicating at least a phenotype of the neurodegenerative disease is associated with the image obtained by imaging the cells of the neurodegenerative disease differentiated from the pluripotent stem cells, the training data used for training the neural network includes data in which at least information showing the phenotype of the neurodegenerative disease that is more prominent at a second time after a first time when the cells of the neurodegenerative disease were captured than that at the first time, is associated with the image obtained by imaging the cells of the neurodegenerative disease, and predict whether or not the phenotype of the neurodegenerative disease will appear in the cells of the neurodegenerative disease differentiated from the pluripotent stem cells based on the information indicating the phenotype output by the neural network in response to the images input; and a determiner configured to determine whether the test substance is a preventive or a therapeutic agent for the neurodegenerative diseases based on prediction results of the predictor.

10. The screening device according to claim 9, wherein:

the determiner determines that the test substance is a preventive or a therapeutic agent for the neurodegenerative diseases in a case where the predictor predicts that the phenotype does not appear in the cells of the neurodegenerative disease differentiated from the pluripotent stem cells.

11. An information processing method in which a computer:

acquires images obtained by imaging cells differentiated from pluripotent stem cells derived from a subject, inputs the acquired images to a neural network trained on training data in which information indicating at least a phenotype of a neurodegenerative disease is associated with the image obtained by imaging the cells of the neurodegenerative disease differentiated from the pluripotent stem cells, the training data used for training the neural network includes data in which at least information showing the phenotype of the neurodegenerative disease that is more prominent at a second time after a first time when the cells of the neurodegenerative disease were captured than that at the first time, is associated with the image obtained by imaging the cells of the neurodegenerative disease, and predicts an onset of the neurodegenerative disease of the subject or effects of drugs on the neurodegenerative disease based on the information indicating the phenotype output by the neural network in response to the images input.

12. A screening method in which a computer:

acquires images obtained by imaging cells of a neurodegenerative disease, which are in contact with a test substance and differentiated from pluripotent stem cells, inputs the acquired images to a neural network trained on training data in which information indicating at least a phenotype of the neurodegenerative disease is associated with the image obtained by imaging the cells of the neurodegenerative disease differentiated from the pluripotent stem cells, the training data used for training the neural network includes data in which at least information showing the phenotype of the neurodegenerative disease that is more prominent at a second time after a first time when the cells of the neurodegenerative disease were captured than that at the first time, is associated with the image obtained by imaging the cells of the neurodegenerative disease, predicts whether or not the phenotype of the neurodegenerative disease will appear in the cells of the neurodegenerative disease differentiated from the pluripotent stem cells based on the information indicating the phenotype output by the neural network in response to the images input, and determines whether the test substance is a preventive or a therapeutic agent for the neurodegenerative diseases based on prediction results.

13. A computer-readable non-transitory storage medium storing a program causing a computer to execute:

acquires images obtained by imaging cells differentiated from pluripotent stem cells derived from a subject, inputs the acquired images to a neural network trained on training data in which information indicating at least a phenotype of a neurodegenerative disease is associated with the image obtained by imaging the cells of the neurodegenerative disease differentiated from the pluripotent stem cells, the training data used for training the neural network includes data in which at least information showing the phenotype of the neurodegenerative disease that is more prominent at a second time after a first time when the cells of the neurodegenerative disease were captured than that at the first time, is associated with the image obtained by imaging the cells of the neurodegenerative disease, and predicts an onset of the neurodegenerative disease of the subject or effects of drugs on the neurodegenerative disease based on the information indicating the phenotype output by the neural network in response to the images input.

14. A computer-readable non-transitory storage medium storing a program causing a computer to execute:

acquires images obtained by imaging cells of a neurodegenerative disease, which are in contact with a test substance and differentiated from pluripotent stem cells, inputs the acquired images to a neural network trained on training data in which information indicating at least a phenotype of the neurodegenerative disease is associated with the image obtained by imaging the cells of the neurodegenerative disease differentiated from the pluripotent stem cells, the training data used for training the neural network includes data in which at least information showing the phenotype of the neurodegenerative disease that is more prominent at a second time after a first time when the cells of the neurodegenerative disease were captured than that at the first time, is associated with the image obtained by imaging the cells of the neurodegenerative disease, predicts whether or not the phenotype of the neurodegenerative disease will appear in the cells of the neurodegenerative disease differentiated from the pluripotent stem cells based on the information indicating the phenotype output by the neural network in response to the images input, and determines whether the test substance is a preventive or a therapeutic agent for the neurodegenerative diseases based on prediction results.

* * * * *

SEQUENCE LISTING

```
<160> NUMBER OF SEQ ID NOS: 1

<210> SEQ ID NO 1
<211> LENGTH: 4
<212> TYPE: PRT
<213> ORGANISM: Artificial Sequence
<220> FEATURE:
<223> OTHER INFORMATION: Synthesized peptide

<400> SEQUENCE: 1

Asp Glu Val Asp
1
```